(12) United States Patent
Wan et al.

(10) Patent No.: US 12,399,955 B2
(45) Date of Patent: Aug. 26, 2025

(54) DATASET CLUSTERING VIA LANGUAGE MODEL PROMPTS

(71) Applicant: Microsoft Technology Licensing, LLC, Redmond, WA (US)

(72) Inventors: Mengting Wan, Bellevue, WA (US); Jennifer Lynay Neville, West Lafayette, IN (US); Longqi Yang, Issaquah, WA (US); Tara Lynn Safavi, Seattle, WA (US); Sujay Kumar Jauhar, Kirkland, WA (US); Chirag Shah, Kenmore, WA (US); Georg Ludwig Wilhelm Buscher, San Jose, CA (US); Reid Marlow Andersen, Los Angeles, CA (US); Sathish Kumar Manivannan, Redmond, WA (US); Xiaochuan Ni, Mountain View, CA (US); Scott Joseph Counts, Seattle, WA (US); Siddharth Suri, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/589,323

(22) Filed: Feb. 27, 2024

(65) Prior Publication Data

US 2025/0094538 A1    Mar. 20, 2025

Related U.S. Application Data

(60) Provisional application No. 63/538,407, filed on Sep. 14, 2023.

(51) Int. Cl.
*G06F 18/23211* (2023.01)
*G06F 16/2457* (2019.01)

(52) U.S. Cl.
CPC .. *G06F 18/23211* (2023.01); *G06F 16/24578* (2019.01)

(58) Field of Classification Search
CPC ............... G06F 18/23211; G06F 16/24578
See application file for complete search history.

(56) References Cited

U.S. PATENT DOCUMENTS

| | | | |
|---|---|---|---|
| 11,048,560 B2 * | 6/2021 | Selvaraj | G06F 9/5055 |
| 11,314,931 B2 * | 4/2022 | Dhoolia | G06F 9/453 |
| 11,625,629 B2 * | 4/2023 | Gelinas | G06N 5/047 |
| | | | 706/48 |
| 12,026,591 B2 * | 7/2024 | Monaghan | G06N 20/20 |
| 12,118,439 B2 * | 10/2024 | Gou | G06N 5/04 |

(Continued)

OTHER PUBLICATIONS

Mswanathan, et al. "Large language models enable few-shot clustering." arXiv preprint arXiv:2307.00524, Jul. 2, 2023, 12 Pages.

(Continued)

*Primary Examiner* — Etienne P Leroux
(74) *Attorney, Agent, or Firm* — Ray Quinney & Nebeker P.C.; James S. Bullough

(57) ABSTRACT

Various embodiments discussed herein relate to prompting a model, such as a Large Language Model (LLM), to ingest natural language clustering instructions and generate corresponding natural language clustering information, such as a cluster description and/or a cluster label without the need to generate any numeric text embeddings.

20 Claims, 13 Drawing Sheets

(56) References Cited

U.S. PATENT DOCUMENTS

2017/0235820 A1     8/2017    Conrad et al.
2020/0394364 A1    12/2020    Venkateshwaran
2022/0414137 A1    12/2022    Sewak et al.
2024/0371367 A1*   11/2024    Churgin .................. G10L 15/02

OTHER PUBLICATIONS

Harris, Matthew, "Using GPT-3.5-Turbo and GPT-4 for Predicting Humanitarian Data Categories.", Retrieved From: https://towardsdatascience.com/using-gpt-3-5-turbo-and-gpt-4-to-apply-text-defined-data-quality-checks-on-humanitarian-datasets-6f02219c693c, Mar. 29, 2023, 32 Pages.

Mehta, et al., "WEClustering: word embeddings based text clustering technique for large datasets.", Complex & intelligent systems, Retrieved From: https://www.ncbi.nlm.nih.gov/pmc/articles/PMC8421191/, Sep. 7, 2021, pp. 3211-3224.

Skyward, Luke, "Using ChatGPT for assigning ontology to KMeans labels", Retrieved From: https://generativeai.pub/using-chatgpt-for-assigning-ontology-to-kmeans-labels-ab7d80a5d767, May 6, 2023, 13 Pages.

* cited by examiner

DATASET CLUSTERING VIA LANGUAGE MODEL PROMPTS

CROSS-REFERENCE TO RELATED APPLICATIONS

This application claims priority to U.S. Provisional Patent Application No. 63/538,407 entitled "DATASET CLUSTERING VIA LANGUAGE MODEL PROMPTS," filed Sep. 14, 2023, which is incorporated by reference in its entirety.

BACKGROUND

Text clustering is a natural language processing (NLP) technology used to group similar text documents together based on their content. Text clustering technologies typically convert each text document into a numerical format called a "text embedding" (e.g., a vector representing all text in the document). Text embeddings have historically played a crucial role in text clustering because they are used for similarity calculations (e.g., calculating Euclidian distance in vector space) and clustering algorithms (e.g., K-means clustering).

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Various embodiments discussed herein relate to prompting a model, such as a Large Language Model (LLM), to ingest natural language clustering instructions and generate natural language clustering information (e.g., a cluster description and/or a cluster label) without the need to generate any numeric text embeddings. For example, particular embodiments may first provide a model a natural language prompt instruction, "summarize the sentiment of each chat conversation," where each chat conversation represents a particular dataset, among various datasets. After the model executes such instruction, various embodiments parse the pool of various datasets into smaller batches or chunks (e.g., in order to fit the model processing size requirements).

Particular embodiments then provide the model the batched summaries and another natural language prompt as input that includes an instruction to generate clusters, generate descriptions of the clusters, update the clusters, and/or generate labels (e.g., names) of the clusters. For example, using the illustration above, particular embodiments may provide the model a prompt instruction to "group and consolidate each chat conversation summary according to its sentiment and generate a descriptions of each group" and/or "assign each group a one-worded name or label." For instance, all "happy" sentiment labeled chat conversation summaries may be grouped together. Responsively, particular embodiments can then assign each original dataset to a particular generated label. Various prompts (e.g., a model ranking prompt or an instance ranking prompt) can then be used to interpret model clustering results, as described in more detail below.

Various embodiments have the technical effect of improved accuracy, such as clustering accuracy, relative to existing text clustering technologies. Various embodiments also have the technical effect of reduced computing resource consumption, such as reduced computer input/output (I/O), reduced processor (e.g., GPU or CPU) utilization, and reduced memory consumption, as described in more detail below.

BRIEF DESCRIPTION OF THE DRAWINGS

The present invention is described in detail below with reference to the attached drawing figures, wherein.

DETAILED DESCRIPTION

Figure 1:
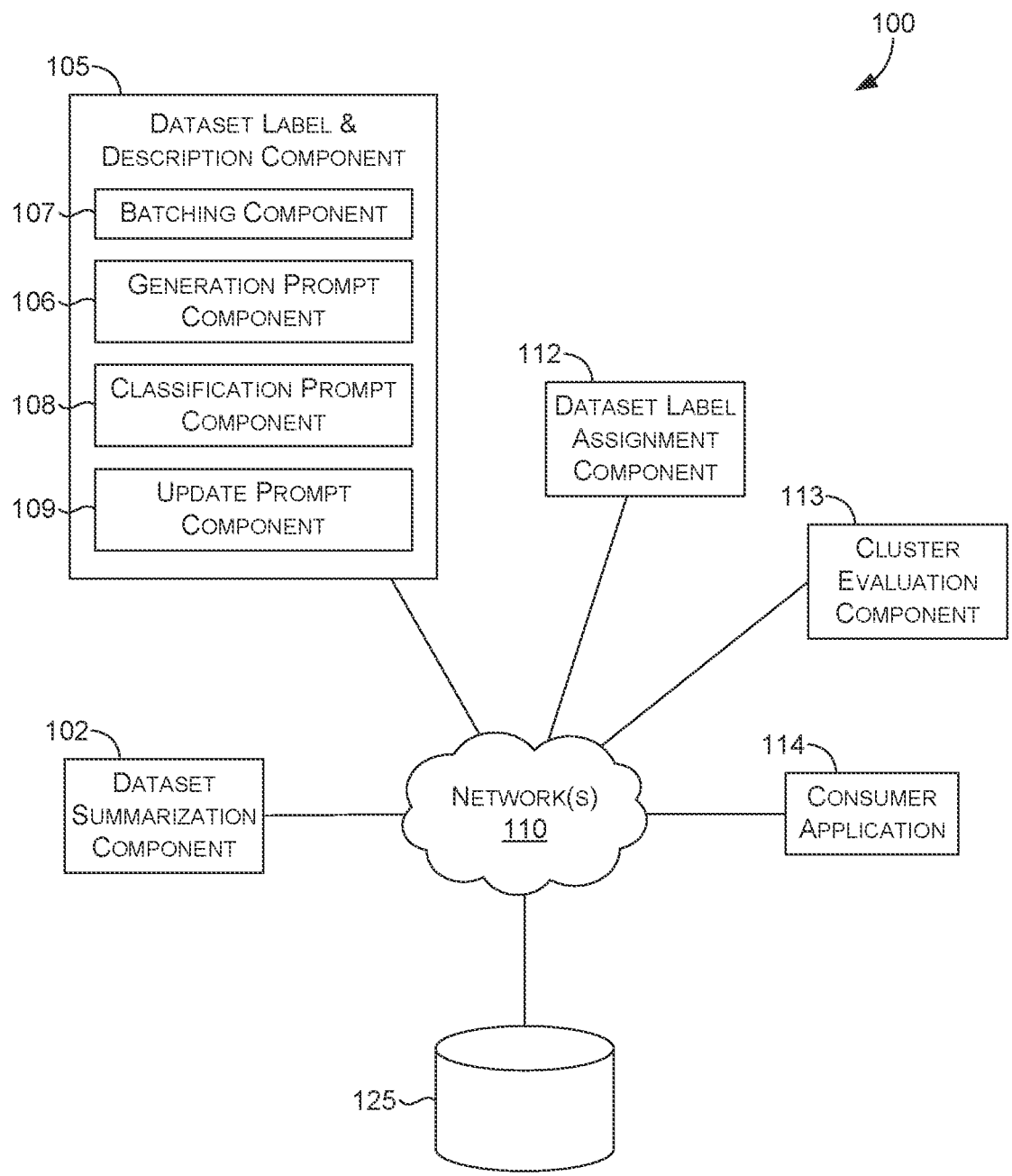
FIG. 1 is a block diagram depicting an example computing system architecture suitable for implementing some embodiments of the disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

Existing text clustering technologies typically perform feature extraction, similarity calculations, clustering algorithms, interpretation, and refinement. Regarding feature extraction functionality, these technologies use a text embedding technique (e.g., WORD2VEC) to convert the text data into numerical vectors. Once these technologies have obtained the numerical vectors (also referred to as "text embeddings") for all documents, these technologies typically measure the similarity between numerical vectors representing the documents using various distance metrics such as cosine similarity, Euclidean distance, or Jaccard similarity. Subsequently, these technologies perform one or more clustering algorithms (e.g., K-means clustering), in order to partition documents into K clusters based on their similarity. Subsequently, users using these technologies can then evaluate and interpret the quality of the clusters using internal or external validation metrics such as silhouette score, purity, or adjusted Rand index to understand the common themes or topics within each cluster. Depending on the results, these technologies may need to adjust preprocessing steps, text embeddings, or clustering algorithm parameters to achieve better clustering results.

There are various deficiencies with existing text clustering technologies. One technical deficiency is the accuracy of these technologies with respect to a given use case (e.g., the accuracy of clustering conversation logs into particular topics). This is because text embeddings, the distance computations, and the clustering algorithms associated therewith reflect mere value differences in a numerical distribution without any indication of what the use case is, especially if the model has not been trained or fine-tuned on the use case. For example, if a model was trained to learn weights for a set of topics only (e.g., based on feeding the model training data of different labeled topics, such as "sales data" or "organization changes"), any other topics (e.g., a specific upcoming meeting) that may be of interest to a user may not be a part of the model results because the model has not trained or fine-tuned on the new topic. Accordingly, any distance measurement or clustering would be inaccurate since the model has not trained on this new topic.

Another related technical problem is the interpretability of these existing text clustering technologies, which also negatively impacts accuracy. As described above, clustering algorithms are produced in a numeric space (e.g., numeric vectors embedded in vector space), which is very difficult to interpret. Specifically, this data is difficult to interpret because of high dimensionality (large vocabulary) of the feature vectors, and semantic complexity (words and phrases can have multiple meanings depending on context) making it challenging to interpret the exact reasons why documents are clustered together. Other challenges include subjectivity because what one person finds as a meaningful cluster may not be the same for another person, and ambiguity (some documents belong to multiple clusters or have ambiguous meaning). Further, clustering algorithms typically rely on mathematical similarities between numerical vectors representing documents, which may not always align with the real-world context. Humans may have additional domain knowledge or context that is not captured by the clustering algorithm. Further, in large datasets with numerous clusters, it can be overwhelming to interpret and make sense of the results. Lastly, text clustering results can change over time, especially in dynamic datasets or when new documents are added. Maintaining and updating cluster interpretations can be challenging.

In yet another technical problem, these text clustering technologies cause a significant consumption of compute resources, such as computer input/output (I/O), processor (e.g., CPU) utilization, and memory consumption. Regarding I/O and CPU utilization, for example, in order to produce clusters (and even understand or interpret clusters), human annotations (e.g., labels) are typically required, as well as additional rounds of fine-tuning. What this means is that I/O is unnecessarily increased because the fine-tuned data and operator (e.g., neural network matrix multiplication) functions must be accessed from storage. Accordingly, this requires storage components (e.g., a read/write head) to repeatedly reach out to storage devices (e.g., disk), which consequently places unnecessary wear on the storage components. For example, each neural network node typically uses multiple input/output tensors, which are input feature representation data structures stored in memory. Accordingly, each time a numerical vector representing a document passes through each neuron and each layer of a neural network, I/O is unnecessarily increased during fine-tuning because the tensors are accessed from memory so that the neurons can perform operations on them and there are many neurons. Accordingly, excessive wear is placed on storage components during fine-tuning, which must access the tensors for every operation, thereby causing excessive wear and tear on a read/write head via repetitive I/O. Similarly, processor (e.g., CPU or GPU) utilization is increased because it must fetch the tensors from memory and perform neural network operations (e.g., matrix multiplication) on all this data during fine-tuning, which overheats the processor, thereby increasing the likelihood of processor register errors, among other risks. Regarding memory consumption, all of the fine-tuning or prompt-tuning data and parameters (which can be in the billions or trillions) need to be stored to memory.

Various embodiments of the present disclosure provide one or more technical solutions that have technical effects in light of these technical problems, as well as other problems, as described herein. Specifically, various embodiments relate to prompting (e.g., via a zero-shot prompt) a model (e.g., a Large Language Model (LLM)) to process or ingest natural language clustering instructions without the need of generating any numeric text embeddings. Specifically, particular embodiments are directed to generating and tailoring cluster information (e.g., a cluster description and/or a cluster label) according to natural language instructions in a prompt of the model. In this way, various embodiments produce clusters that are both useful and interpretable with very little to no human supervision. For example, the only human input is to formulate one or more natural language use case-specific instructions in language model prompts in some embodiments.

Various embodiments employ the technical effect of improved accuracy with respect to any use case relative to text clustering technologies. One technical solution is the concept of generating natural language clusters or associated information (e.g., a natural language summary of a dataset, a natural language cluster description and/or a label) via model. Another technical solution is that the model accepts natural language inputs (e.g., a LLM prompt of natural language characters of a dataset and/or natural language summary of a dataset). Accordingly, some embodiments do not employ (or need to employ) numeric text embeddings (e.g., vectors), and by implication, distance computations, because clustering is performed via prompt engineering or otherwise through a natural language instruction and/or a natural language output. For example, in order to generate a cluster, a natural language instruction may state, "categorize each dataset according to sentiment and provide a corresponding description of each category" and/or "give the category a single word name or label," which corresponds to a particular cluster and its name/label. In this way, any specific use case can be specified in the prompt or natural language instruction. Accordingly, for example, using the illustration above, even if a model was trained to learn weights for a finite set of topics only, if any other topic is of interest to a user (not learned by the model), the user can simply prompt the model in natural language to derive a cluster (e.g., "generate all the different topics in this dataset" and/or "give each topic a topic name").

Another related technical solution with respect to model accuracy is the interpretability of clustering data. As described above, clustering algorithms are produced in a numeric space (e.g., numeric vectors embedded in vector space), which is very difficult to interpret. However, various embodiments implement the technical solution of clustering and/or summarizing natural language characters based on using natural language characters as input and/or generating natural language characters as an output to derive cluster information, such as labels and/or descriptions associated with the clusters. For example, a language model may ingest a natural language prompt that states "generate and summarize different clusters of sentiment of each data set" (e.g., representing a cluster and its description) and "give each cluster a natural language name" (e.g., representing a cluster label). Accordingly, there is no high dimensionality to take into consideration given the natural language inputs and/or outputs. There is also not as much subjectivity because the same or similar prompt should always produce the same cluster information. There should not be as much ambiguity because each dataset is summarized in natural language such that they should not belong to multiple clusters or have ambiguous meaning. Further, some embodiments do not rely on mathematical similarities between numerical vectors representing documents because they do not use numerical vectors to compute distance, but rather use natural language. Humans have additional domain knowledge or context that can be used in a prompt of a language model that is not captured by typical clustering algorithms. Further, humans can more easily interpret and make sense of the results because the outputs of the model are in natural language (e.g., cluster descriptions, and cluster labels), as opposed to numerical representations. Moreover, the inputs (e.g., prompts) to the model can dynamically change or reflect any user intent at any given time. Accordingly, for example, if a new document or dataset is added, a corresponding dynamic new prompt can be generated to generate accurate clusters. Lastly, various embodiments also implement the technical solution of a model ranking prompt and/or an instance ranking prompt, as described in more detail below.

Some embodiments have technical effect of reduced consumption of compute resources, such as computer input/output (I/O), processor (e.g., CPU) utilization, and memory consumption. This is because various embodiments do not fine-tune or prompt-tune a model to learn weights for use case data. Accordingly, one technical solution is that the input(s) to the model can include one or more zero-shot prompts that are not part of training or the model is otherwise prompt engineered. In natural language processing models, "zero-shot prompting" means providing a prompt that is not part of the training data to the model, but the model can generate a result that a user desires. A LLM, for example, need not be retrained. For instance, a user can instruct the LLM to classify a paragraph or summarize it into a "positive sentiment" or "negative sentiment" since the model knows what "positive" and "negative" should be based on having already been pre-trained (e.g., via MLM or NSP). This works because, during pre-training, the model learned the meaning of these words and acquired the ability to follow simple instructions. Accordingly, the model need not be fine-tuned or prompt-tuned.

In this way, regarding I/O and CPU utilization, for example, in order to produce clusters (and even understand or interpret clusters), various embodiments do not employ human annotations (e.g., labels) and additional rounds of fine-tuning/prompt-tuning. What this means is that I/O is reduced because the fine-tune/prompt-tune data and operator functions do not have to be accessed from storage since fine-tuning and prompt-tuning does not occur in these embodiments. Accordingly, this requires storage components (e.g., a read/write head) to reach out to storage devices (e.g., disk) fewer times, which consequently places less wear on the storage components. In other words, since there is no fine-tuning or prompt-tuning, I/O is reduced because the tensors are not accessed from memory such that the neurons do not perform operations on them during this time. Accordingly, less wear is placed on storage components because tensors are accessed fewer times, thereby causing less wear and tear on a read/write head via less I/O. Similarly, processor (e.g., CPU or GPU) utilization is decreased because it fetches the tensors from memory and performs neural network operations (e.g., matrix multiplication) on all this data fewer times and no times during fine-tuning/prompt-tuning (since this step does not exist). This reduces heat experienced by the processor, thereby reducing the likelihood of processor register errors, among other risks. Similarly, regarding memory consumption, no fine-tuning or prompt-tuning data and parameters need to be stored to memory because no fine-tuning or prompt-tuning occurs, thereby reducing memory consumption.

Turning now to FIG. 1, a block diagram is provided showing aspects of an example computing system architecture suitable for implementing some embodiments of the disclosure and designated generally as system 100. The system 100 represents only one example of a suitable computing system architecture. Other arrangements and elements can be used in addition to or instead of those shown, and some elements may be omitted altogether for the sake of clarity. Further, as with system 100, many of the elements described herein are functional entities that are implemented as discrete or distributed components or in conjunction with other components, and in any suitable combination and location according to various embodiments.

Example system 100 includes network(s) 110, which is described in connection to FIG. 14, and which communicatively couples components of system 100 including a dataset summarization component 102, a dataset label and description component 105, a dataset label assignment component 112, a cluster evaluation component 113, a consumer application component 114, and storage 125. The system 100 is generally responsible for assigning a natural language label to each dataset. In some embodiments, these components in the system 100 are embodied as a set of hardware circuitry components (e.g., a hardware accelerator, such as a GPU AI hardware accelerator), compiled computer instructions or functions, program modules, computer software services, a combination thereof, or an arrangement of processes carried out on one or more computer systems, such as computing device 11 described in connection to FIG. 15, and the user device 02a and/or the server 06 of FIG. 14, for example.

In some embodiments, the functions performed by components of system 100 are associated with one or more personal assistant applications, services, or routines. In particular, such applications, services, or routines can operate on one or more user devices (such as user device 02a of FIG. 14), servers (such as server 06 of FIG. 14), can be distributed across one or more user devices and servers, or be implemented in the cloud. Moreover, in some embodiments, these components of system 100 are distributed across a network, including one or more servers (such as server 06 of FIG. 14) and client devices (such as user device 02a of FIG. 14), in the cloud, or reside on a user device, such as user device 02a of FIG. 14. Moreover, these components, functions performed by these components, or services carried out by these components are implemented at appropriate abstraction layer(s) such as the operating system layer, application layer, and/or hardware layer of the computing system(s). Alternatively, or in addition, in some embodiments, the functionality of these components and/or the embodiments described herein are performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs). Additionally, although functionality is described herein with regards to specific components shown in example system 100, it is contemplated that in some embodiments functionality of these components are shared or distributed across other components.

In some embodiments, each of the active components of the system 100 (i.e., the dataset summarization component 102, the dataset label and description component 105, the dataset label assignment component 112, and/or the consumer application 114) perform their functionality at runtime or after a machine learning model has been deployed. However, it is understood that at least some of the components of the system 100 can additionally or alternatively perform their functionality in training, testing, fine-tuning, and/or offline environments.

Continuing with FIG. 1, the dataset summarization component 102 is generally responsible for generating a natural language summary of one or more datasets. A "dataset" as described herein refers to any data object or data structure (e.g. a chat, a web/app page, a mobile activity, a container, or a HTML document) that includes one or more natural language characters (e.g., English-based letters, words, numbers, symbols, etc.). For example, a first dataset can be a first chat message and on a web page and a second dataset can be a second chat message on the same or different web page. In another example, a first dataset can be a first file/document representing a first written letter and a second dataset can be a second file/document representing a second written letter. In yet another example, a first dataset can be all the chat messages generated on a first day or under a first chat thread and the second dataset can be all the chat messages generated on a second day or under a second chat thread. In yet another example, a first dataset can include a digital written transcript of a first meeting (via speech-to-text) and a second dataset can include another digital written transcript of a second meeting. In yet another example, a first dataset can be a first email and corresponding text and a second dataset can be a second email and corresponding text. In some embodiments, a dataset includes or represents a "natural language summary," as described herein.

A "natural language summary" as described herein refers to text summarization. Text summarization (or automatic summarization or NLP text summarization) is the process of breaking down text (e.g., several paragraphs) into smaller text (e.g., one sentence or paragraph). In other words, text summarization is the process of distilling the most important information from a source (or sources) to produce an abridged version for a particular user (or users) and task (or tasks). This method extracts vital information while also preserving the meaning of the text. This reduces the time required for grasping lengthy pieces such as articles without losing vital information, for example. For example, using extraction summarization, some embodiments, using NLP, detect key chunks of natural language text, extracting or cutting them out, then stitching them back together to create a shortened form of the dataset. For instance, a sentence in the dataset may read, "I'm heading to the supermarket by taking Ray road. Hopefully there will not be as much traffic at that time. I'm going to buy fruit." Extraction summarization may work by reducing the characters to "I'm heading to the supermarket. I'm going to buy fruit." In another example, abstractive summarization works by generating new sentences (or other natural language characters) from the original dataset. For example, using the original dataset described above, the summarization may be, "I'm heading to the store to buy fruit," where "store" is a new word input into the new sentence (e.g., based on NLP semantic analysis and/or NER) and "I'm going" is removed from the original sentence.

NER is an information extraction technique that identifies and classifies tokens/words or "entities" in natural language text into predefined categories. Such predefined categories may be indicated in corresponding tags or labels, which can be used in summaries. Entities can be, for example, names of people, specific organizations, specific locations, specific times, specific quantities, specific monetary price values, specific percentages, specific pages, and the like. Likewise, the corresponding tags or labels can be specific people, organizations, location, time, price (or other invoice data) and the like. NER and/or other NLP functionality can be used to understand and summarize natural language, such as tokenization (breaking text into words or phrases), stemming (reducing words to their base form), and part-of-speech tagging (identifying the grammatical role of words), semantic analysis (to derive meaning of a first word based on context/meaning of other words by the first word), and/or syntactic analysis (detecting the grammatical structure of a sentence or a sequence of words to determine its syntactic structure, or understand how words are organized in a sentence and how they relate to each other in terms of grammatical rules).

In some embodiments, the dataset summarization component 102 generates one or more summaries according to one or more use case-specific natural language instructions in a prompt. For example, an instruction can be issued by a user to "summarize the sentiment of this document." Sentiment analysis is the use of NLP for analyzing digital text to determine if the emotional tone of the message is positive, negative, or neutral, for example. Any text generation functionality may additionally or alternatively be used relative to text summarization. Text generation is the process of generating human natural language text with the goal of appearing indistinguishable to human-written text. In some embodiments, this is done via Next Sentence Prediction (NSP) or Masked Language Modeling (MLM). Typical text generation is performed in response to a user instruction, such as "write me a letter to mom," where the output is a text generation of an entire document of natural language text. Other use cases include machine translation. Machine translation is the process of using machine learning to automatically translate text from one language to another without human involvement.

The dataset label and description component 105 includes a batching component 107, a generation prompt component 106, a classification prompt component 108, and an update prompt component 109. The database label and description component 105 is generally responsible for taking each summary generated by the dataset summarization component 102 as input (and/or the natural language instructions associated with 106, 108, and/or 109) in order to generate one or more natural language labels and/or natural language descriptions. A "label" as described herein refers one or more natural language characters (e.g., a word) that describes a respective cluster, category, or group according to a particular use case. For example, a label can be the name of a specific semantic category, such as "sad," or "happy." A label additionally or alternatively refers to a particular category or name of one or more natural language summaries. A "description" as described herein refers to a natural language summary of: two or more natural language summaries, a cluster, a category, etc. of a specific use case.

The batching component 107 is generally responsible for parsing or splitting all the natural language summaries generated by the dataset summarization component 102 into two or more batches (e.g., mini batches) or units/chunks of data. For example, based on the token prompt/input constraints of the model (i.e., a model being only able to ingest a particular quantity/amount of tokens/words under a threshold), the model can break all the natural language summaries down to a token quantity under the threshold. The datasets can be batched in any suitable manner according to any programmatic rules or hand-coded data structures, such as breaking up or combining datasets by the week (e.g., combining all emails written during a first week (a first batch) and then combining all emails written during a second week (a second batch)). In some embodiments, the batching component 107 alternatively or additionally batches datasets by taking all of the dataset summaries and their size and dividing it by the input constraint size of the model. For example, if all the natural language summaries together is 25 k and the input size constraint of a model is 5K, then particular embodiments break the natural language summaries down into 5 equal chunks (based on dividing 25 by 5) to be processed by the model.

The generation prompt component 106 is generally responsible for processing a generation prompt. A "generation prompt" as described herein refers to a prompt that includes one or more natural language instructions to generate one or more clusters, one or more natural language labels, and/or a one or more descriptions. For example, the generation prompt can include multiple natural language instructions to generate, for a first batch only, clusters represented in a table, where each row includes a natural language label (e.g., a category) of the cluster. The generation prompt can further include an instruction to output a label/name of the cluster/row, to only output a certain number of natural language labels, and an instruction that there are to be no overlaps or contradictions in natural language label name or natural language description, and that the cluster names and/or descriptions should be clear (e.g., in active voice) and concise (e.g., no more than 3 words). For instance, the different rows may represent cluster names, such as "happy," "mad," or "indifferent," representing different sentiment states.

The classification prompt component 108 is generally responsible for processing a classification prompt. A "classification prompt" as described herein refers to a prompt that includes one or more natural language instructions to assign one or more labels generated via the generation prompt to other batches (not the first batch). For example, the classification prompt can include an instruction to assign one or more portions of other batches of other datasets into the existing labels of "happy," "mad," or "indifferent." For instance, the first batch may include a sentence that reads, "Joe: this is the fifth time I tried to get my money back! I'm cancelling my subscription." Particular embodiments assign this sentence to a "mad" label. A second batch may include another sentence representing the same user (Joe) later in a conversation after having responded to a customer service representative: "Okay, thanks for agreeing to give me my money back no later than 5 today. That makes me relieved." Particular embodiments may then assign this sentence to a "happy" label.

The update prompt component 109 is generally responsible for processing an update prompt. An "update prompt" as described herein refers to a prompt that includes one or more natural language instructions to revise or update the natural language labels and/or natural language descriptions. To "revise" a natural language label and/or description as described herein means to add a natural language label, remove a natural language label, and/or change a natural language label. For example, using the illustration above, more cluster names (e.g., rows) can be added, such as sentiment of "sad," and "excited." In another example, the cluster name of "indifferent" can be removed. In another example, the cluster name of "happy" can be renamed as "happy and excited."

Continuing with FIG. 1, the system 100 includes the dataset label assignment component 112. The dataset label assignment component 112 takes, as input, the generated and/or updated labels and/or descriptions made by the dataset label and description component 105 to then assign each dataset to a particular natural language label. For example, using the illustration above, embodiments can assign a document (before it was summarized) into a "happy and excited" label.

The cluster evaluation component 113 is generally responsible for evaluating groups or clusters based on ingesting a model ranking prompt and/or an instance ranking prompt, as described in more detail below. Instead of, for example, interpreting the quality of the clusters using internal or external validation metrics such as silhouette score, purity, or adjusted Rand index to understand the common themes or topics within each cluster, as existing technologies do, particular embodiments prompt a language model to interpret the quality of clusters. In other words, particular embodiments can feed the language model a natural language instruction to, for example, rank each cluster according to its relevance for a given dataset and/or determine the similarity between datasets of different clusters and a reference dataset representing a "ground truth" cluster, as described in more detail below.

The consumer applications 114 generally refers to one or more computer applications or services, such as online/cloud applications or locally stored apps that consume, include, or utilize some or each of the components of the system 100. In particular, the consumer application 114 may upload a particular document (a dataset), receive one or more natural language instructions or prompts from a user, process such prompts (e.g., via the generation prompt component 106, the classification prompt component 108, and the update prompt component 109) and cause presentation of an indication of which label the document is assigned to, as described within the system 100. In some embodiments, a consumer application 114 may utilize a presentation component to cause presentation of visual results. Examples of consumer applications 114 may include, without limitation, computer applications or services for clustering data or other computer applications that include such functionality, such as social media service applications (e.g., PINTEREST, FACEBOOK, etc.), email, messaging, chat, or any other web application, plugin, extension, or locally stored application.

Example system 100 also includes storage 125. Storage 125 generally stores information including data, computer instructions (for example, software program instructions, routines, or services), data structures, and/or models used in embodiments of the technologies described herein. In some embodiments, storage 125 represents any suitable data repository or device, such as a database, a data warehouse, RAM, cache, disk, RAID, and/or a storage network (e.g., Storage Area Network (SAN)). In some embodiments, storage 125 includes data records (e.g., database rows that represent each cluster) that contain any suitable information described herein. In some embodiments, each record is called or requested and returned, over the computer network(s) 110, depending on the component needing it, as described herein.

Figure 2:
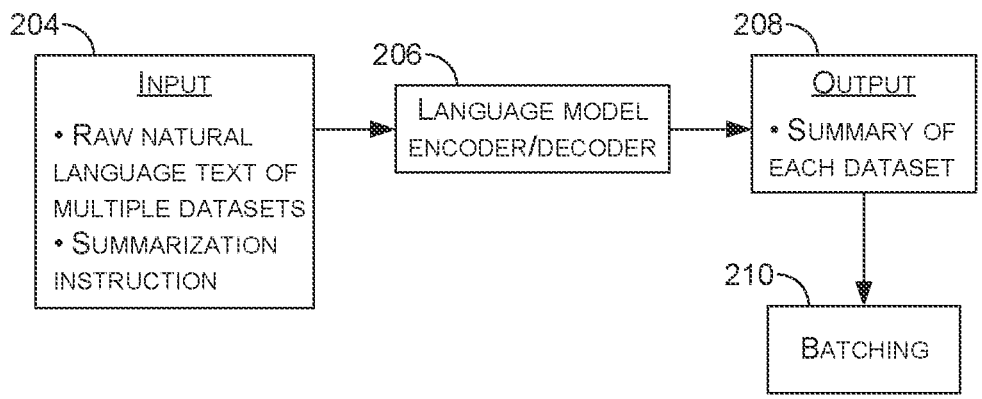
FIG. 2 is a schematic diagram illustrating how a natural language summary of each dataset is generated, according to some embodiments.

FIG. 2 is a schematic diagram illustrating how a natural language summary of each dataset is generated, according to some embodiments. In some embodiments, FIG. 2 illustrates how dataset summarization component 102 generates summaries, according to some embodiments. The input 204 is fed to the language model encoder(s) and/or decoder(s) 206, which then produces the output 208, which is then batched via the batching 210. In some embodiments, the language model encoder(s)/decoder(s) represent any suitable language model or component thereof, such as a LLM (e.g., a GPT or BERT), a transformer, or other machine learning model. In some embodiments, the input 204 (or any other input described herein, such as 304 and/or 404 of FIG. 3 and FIG. 4) refers to user-generated input, such as typed natural language instructions. In other instances, such inputs are alternatively or additionally computer-generated inputs.

A "language model" is a set of statistical or probabilistic functions that performs Natural Language Processing (NLP) in order to understand, learn, and/or generate human natural language content. For example, a language model can be a tool that determines the probability of a given sequence of words occurring in a sentence (e.g., via NSP or MLM) or natural language sequence. Simply put, it can be a tool which is trained to predict the next word in a sentence. A language model is called a large language model ("LLM") when it is trained on enormous amount of data. Some examples of LLMs are GOOGLE's BERT and OpenAI's GPT-2 and GPT-3. GPT-3, and GPT-4, which has over 175 billion parameters trained on over 570 gigabytes of text. These models have capabilities ranging from writing a simple essay to generating complex computer codes—all with limited to no supervision. Accordingly, an LLM is a deep neural network that is very large (billions to hundreds to trillions of parameters) and understands, processes, and produces human natural language by being trained on massive amounts of text. These models can predict future words in a sentence letting them generate sentences similar to how humans talk and write. In some embodiments, the LLM is pre-trained (e.g., via NSP and MLM on a natural language corpus to learn English) without having been fine-tuned, but rather uses prompt engineering/prompting/prompt learning using one-shot or few-shot examples.

Continuing with FIG. 2, the input 204 includes the raw natural language text of multiple datasets (e.g., multiple conversations in a chat thread) and a summarization instruction, where each dataset is represented by $(X_i)$. The summarization instruction includes a natural language instruction to summarize one or more given datasets according to a particular use case. For example, the summarization instruction may be included in a zero-shot prompt, which states, "for each dataset, summarize the topic." Responsively, the language model encoder(s)/decoder(s) 206 generates a text summary—i.e., the "summary of each dataset" as illustrated in the output 208, which is represented by $(f_i)$. For example, the output 208 can be, "for the first dataset, this first set of chat threads describes two projects that are due next Friday," and "For the second dataset, this second set of chat threads discusses due date and action items associated with the two projects." The batching 210 then parses the output 288. In some embodiments, the batching 210 represents the functionality performed by batching component 105 as described with respect to FIG. 1. Using the illustrative example above, for example, the batching 210 includes concatenating the first dataset and the second data set together such that they are written to a same container or data structure for downstream processing (as described in more detail below). In another example, the batching 210 includes splitting the first and second datasets apart such that they are contained in different data structures for downstream processing.

Figure 3:
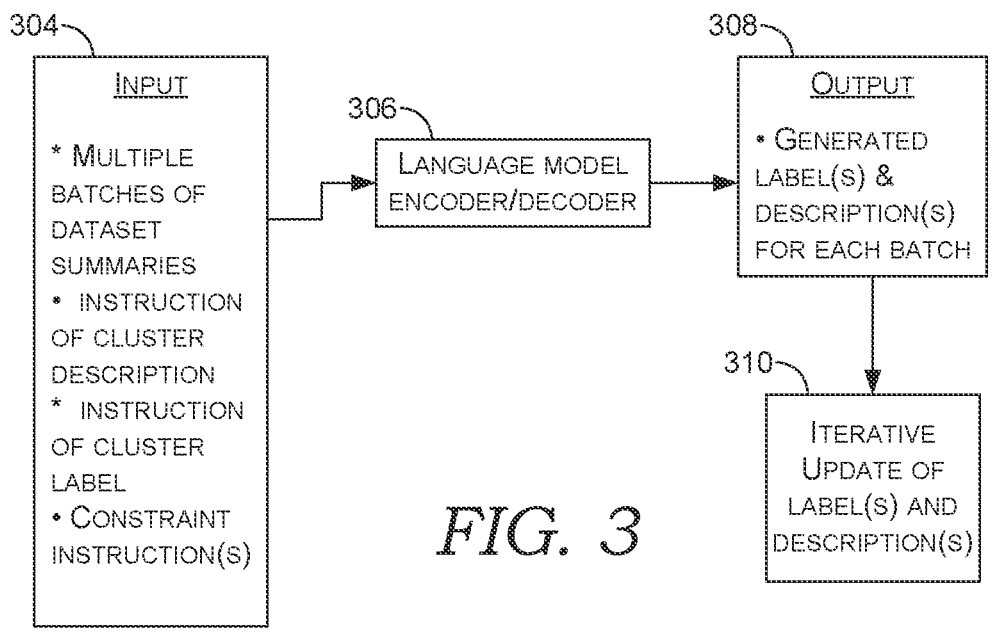
FIG. 3 is a schematic diagram illustrating how clusters, labels for the clusters, and descriptions of clusters are generated and updated for each batch, according to some embodiments.

FIG. 3 is a schematic diagram illustrating how clusters, labels for the clusters, and descriptions of clusters are generated and updated for each batch, according to some embodiments. In some embodiments, FIG. 3 illustrates how the dataset label and description component 105 generates natural language labels and/or descriptions, according to some embodiments. The input 304 is fed to the language model encoder(s) and/or decoder(s) 306 (which may be the same model as 206 of FIG. 2), which then produces the output 308, which is then updated via 310.

The input 304 includes multiple batches of dataset summaries (i.e., natural language summaries), an instruction of cluster descriptions, an instruction of cluster labels, and one or more constraint instructions. The multiple batches of dataset summaries represents a collection of document summaries generated from FIG. 2, where $D=\{f_i\}$, and where $f_i$ refers to the feature(s) of document i. For example, the multiple batches of dataset summaries may be summaries of the user intent of different text messages. "User intent" or intent recognition is a term used in natural language processing (NLP) to describe the purpose or intent behind a linguistic expression, such as an affirmation or a question (e.g., the intent behind a query or action performed using specific data). An instruction of cluster description is a natural language instruction for the model to summarize, group, and/or cluster the dataset summaries in a certain way according to a particular use case and generate corresponding descriptions. For example, using the illustration above, the instruction of cluster description can be an instruction in a prompt that states, "group or categorize the dataset summaries according to the user intent type (representing a cluster) and summarize each group or category (i.e., the "description"). Consider an analogy of Mixture Models, where the name and description of each cluster can be used to represent the distribution of each component.

An instruction of cluster label refers to a natural language instruction to generate a natural language label for the cluster/group/category. For example, using the illustration above, the instruction of cluster label may be "summarize each category or group description with no more than two words." The constraint instruction(s) may be any sort of criteria indicated in natural language that the model needs to follow, such as requesting that each group or category be represented as a row in a table, requesting that the model only output a certain quantity of categories or groups, a request that the model provide no overlaps or contradictions for the categories, a request that the cluster name and/or description be concise and clear, and the like.

Continuing with FIG. 3, the output 308 includes the generated cluster description(s) and label(s) for each batch. Each batch can contain one or more cluster descriptions or clusters and thus one or more cluster labels or names. Per step 310, there is an iterative update of the cluster label(s) and description(s), which is analogous to stochastic optimization. For example, the dataset summaries are broken down into M mini batches (e.g., by the batching 210) ($\{D_m\}$) where each batch of data can fit into the language model context window (i.e., meet its input size constraints). Per step 310, embodiments streamline these min-batches, update the generated clusters (e.g., the descriptions of the clusters and/or the labels) based on the current batch data ($D_m$) and the output clusters from the previous batch (Pm−1(θ)). Step 310 is described in more detail below.

Figure 4:
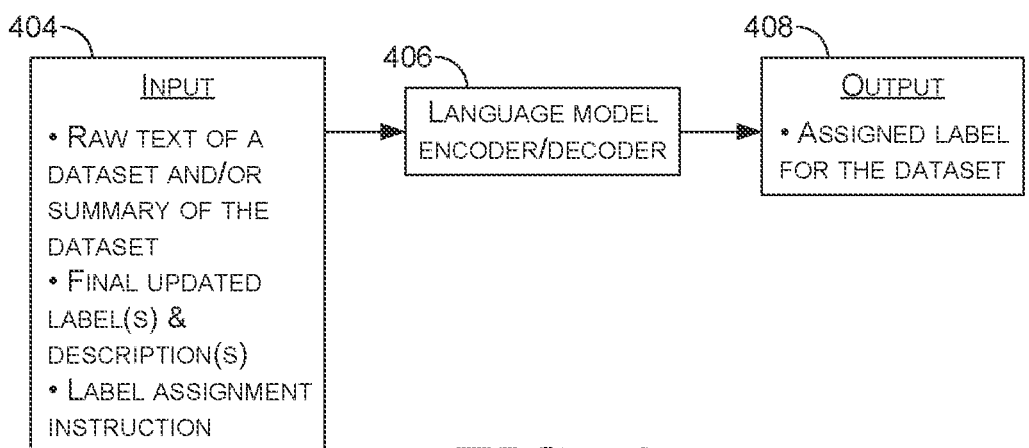
FIG. 4 is a schematic diagram illustrating how labels are assigned for each dataset, according to some embodiments.

FIG. 4 is a schematic diagram illustrating how labels are assigned for each dataset, according to some embodiments. In some embodiments, FIG. 4 illustrates how the dataset label assignment component 112 functions, according to some embodiments. The input 404 is fed to the language model encoder(s) and/or decoder(s) 406 (which may be the same model as 206 of FIG. 2), which then produces the output 408.

The input 404 includes raw text of a dataset ($X_i$) and/or a summary of the dataset ($f_i$) from FIG. 2, final updated label(s) and description(s) (i.e., generated cluster labels (names) and cluster descriptions (definitions) from FIG. 3, and/or a label assignment instruction. A dataset may include one or more of the raw natural language text of multiple datasets, as illustrated in the input 204 of FIG. 2. The summary of the dataset may be one of the natural language summaries as included in the output 208 of FIG. 2. In some embodiments, the final updated label(s) and description(s) represent the finalized labels and descriptions as performed via the iterative update of the label(s) and description(s), as indicated in step 310 of FIG. 3.

The label assignment instruction is a natural language instruction to a model that requests the model to assign each natural language label to each dataset. For example, using the illustration above, for a set of text messages (representing multiple datasets), the instruction may be included in a prompt that states to "assign each natural language label representing a particular topic (the use case) to each set of text messages," where each "set" of text messages (the dataset) represents a particular day that text messages were exchanged. In another example of a label assignment instruction, "assign cluster name (the natural language label) to this document for sentiment analysis."

Figure 5:
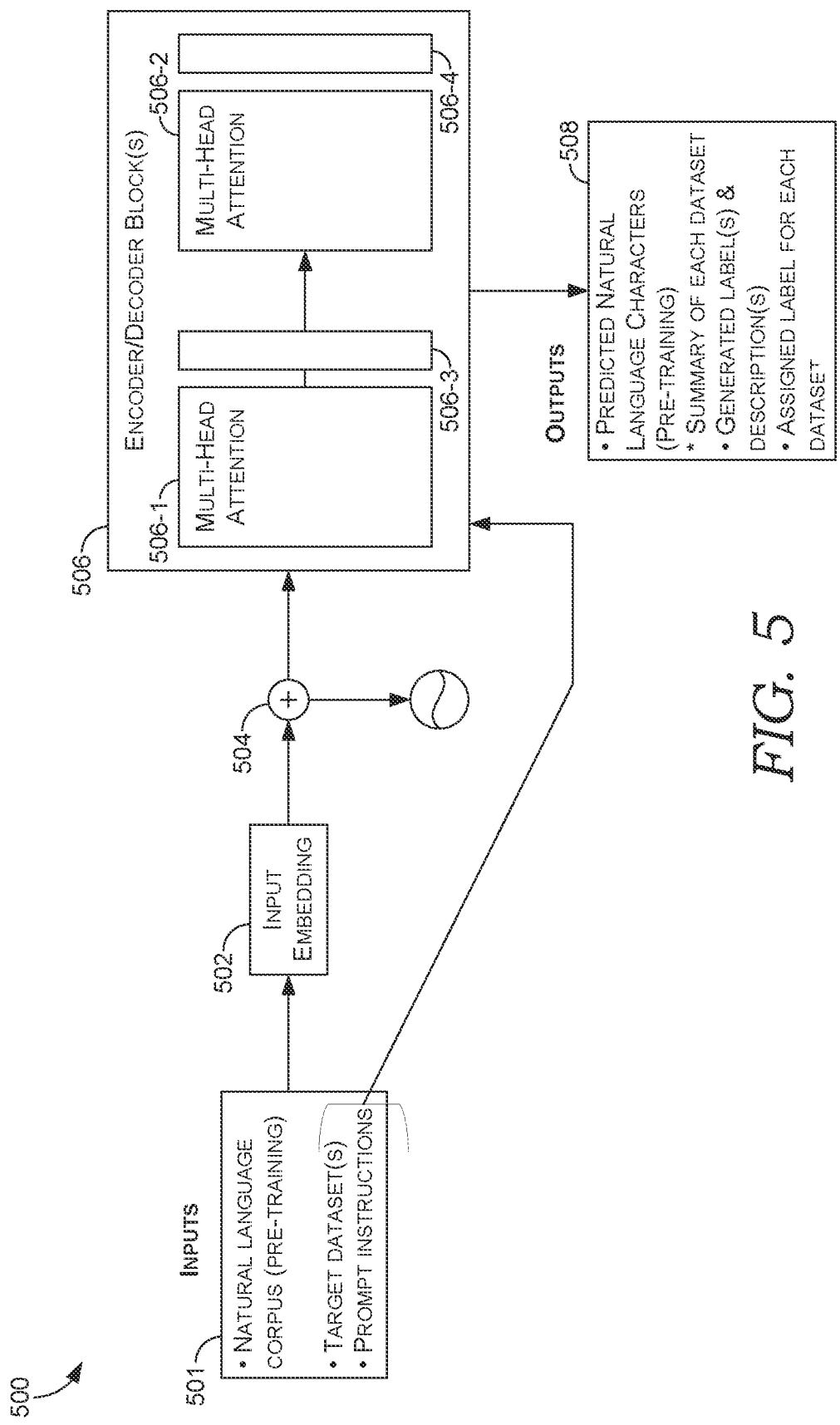
FIG. 5 is a block diagram of a Large Language Model that uses particular inputs to make particular predictions, according to some embodiments.

FIG. 5 is a block diagram of a Large Language Model 500 (e.g., a BERT model or GPT-4 model) that uses particular inputs to make particular predictions (e.g., generate clusters), according to some embodiments. In some embodiments, this model 500 represents or includes the functionality as described with respect to the language model encoder(s)/decoder(s) 206, 306, and/or 406 of FIGS. 2, 3, and/or 4. In various embodiments, the language model 500 includes one or more encoders and/or decoder blocks 506 (or any transformer or portion thereof).

First, a natural language corpus (e.g., various WIKIPEDIA English words or BooksCorpus) of the inputs 501 are converted into tokens and then feature vectors and embedded into an input embedding 502 to derive meaning of individual natural language words (for example, English semantics) during pre-training. In some embodiments, to understand English language, corpus documents, such as text books, periodicals, blogs, social media feeds, and the like are ingested by the language model 500.

In some embodiments, each word or character in the input(s) 501 is mapped into the input embedding 502 in parallel or at the same time, unlike existing long short-term memory (LSTM) models, for example. The input embedding 502 maps a word to a feature vector representing the word. But the same word (for example, "apple") in different sentences may have different meanings (for example, phone v. fruit). This is why a positional encoder 504 can be implemented. A positional encoder 504 is a vector that gives context to words (for example, "apple") based on a position of a word in a sentence. For example, with respect to a message "I just sent the document," because "I" is at the beginning of a sentence, embodiments can indicate a position in an embedding closer to "just," as opposed to "document." Some embodiments use a sign/cosine function to generate the positional encoder vector as follows:

$$[PE]\_((pos, 2i)) = \sin\left(pos/(10000] \wedge ([2i/d]\_model)\right)$$

$$[PE]\_((pos, 2i+1)) = \cos\left(pos/(10000] \wedge ([2i/d]\_model)\right)$$

After passing the input(s) 501 through the input embedding 502 and applying the positional encoder 504, the output is a word embedding feature vector, which encodes positional information or context based on the positional encoder 504. These word embedding feature vectors are then passed to the encoder and/or decoder block(s) 506, where it goes through a multi-head attention layer 506-1 and a feedforward layer 506-2. The multi-head attention layer 506-1 is generally responsible for focusing or processing certain parts of the feature vectors representing specific portions of the input(s) 501 by generating attention vectors. For example, in Question Answering systems, the multi-head attention layer 506-1 determines how relevant the ith word (or particular word in a sentence) is for answering the question or relevant to other words in the same or other blocks, the output of which is an attention vector. For every word, some embodiments generate an attention vector, which captures contextual relationships between other words in the same sentence or other sequence of characters. For a given word, some embodiments compute a weighted average or otherwise aggregate attention vectors of other words that contain the given word (for example, other words in the same line or block) to compute a final attention vector.

In some embodiments, a single headed attention has abstract vectors Q, K, and V that extract different components of a particular word. These are used to compute the attention vectors for every word, using the following formula:

$$Z = softmax([Q \cdot K] \wedge T/\sqrt{(\text{Dimension of vector } Q, K \text{ or } V)}) \cdot V$$

For multi-headed attention, there a multiple weight matrices Wq, Wk and Wv. so there are multiple attention vectors Z for every word. However, a neural network may only expect one attention vector per word. Accordingly, another weighted matrix, Wz, is used to make sure the output is still an attention vector per word. In some embodiments, after the layers 506-1 and 506-2, there is some form of normalization (for example, batch normalization and/or layer normalization) performed to smoothen out the loss surface making it easier to optimize while using larger learning rates.

Layers 506-3 and 506-4 represent residual connection and/or normalization layers where normalization re-centers and re-scales or normalizes the data across the feature dimensions. The feedforward layer 506-2 is a feed forward neural network that is applied to every one of the attention vectors outputted by the multi-head attention layer 506-1. The feedforward layer 506-2 transforms the attention vectors into a form that can be processed by the next encoder block or making a prediction at 508. For example, given that a document includes first natural language sequence "the due date is . . . " the encoder/decoder block(s) 506 predicts that the next natural language sequence will be a specific date or particular words based on past documents that include language identical or similar to the first natural language sequence.

In some embodiments, the encoder/decoder block(s) 506 includes pre-training to learn language (pre-training) and make corresponding predictions. In some embodiments, there is no fine-tuning or prompt-tuning because some embodiments perform prompt engineering or zero-shot learning. "Prompt engineering" refers to a process of designing or using structured input to the model (referred to as a prompt or prompts) to cause a desired response to be generated by the model. In some embodiments, prompt engineering includes creating the best or optimal prompt, or series of prompts, for the desired user task or output without changing weights of the model or model architecture. Accordingly, given a first prompt, if the model produces a first output with a high likelihood of not being the correct response, particular embodiments keep generating different prompts until the desired output is produced. In this way, at model deployment time, no output is ever produced with a low likelihood of being the correct response if the first prompt (or variation thereof) is provided, thereby increasing the accuracy of the model's generative outputs. In some embodiments, prompt engineering (or any prompt described herein) includes 1-shot or few-shot examples, which are representative or example outputs. For example, if an instruction was to "generate clusters of different sentiment," a one-shot example may include a table of datasets (different than existing datasets), where each record or row represents a cluster of a particular sentiment.

Pre-training is performed to understand language and fine-tuning is performed to learn a specific task, such as learning an answer to a set of questions (in Question Answering systems). In some embodiments, the encoder/decoder block(s) 506 learns what language and context for a word is in pre-training by training on two unsupervised tasks (MLM and NSP) simultaneously or at the same time. In terms of the inputs and outputs, at pre-training, the natural language corpus of the inputs 501 may be various historical documents, such as text books, journals, periodicals in order to output the predicted natural language characters in 508 (not make the predictions at runtime or prompt engineering at this point). The encoder/decoder block(s) 506 takes in a sentence, paragraph, or sequence (for example, included in the input(s) 501), with random words being replaced with masks. The goal is to output the value or meaning of the masked tokens. For example, if a line reads, "please [MASK] this document promptly," the prediction for the "mask" value is "send." This helps the encoder/decoder block(s) 506 understand the bidirectional context in a sentence, paragraph, or line at a document. In the case of NSP, the encoder/decoder block(s) 506 takes, as input, two or more elements, such as sentences, lines, or paragraphs and determines, for example, if a second sentence in a document actually follows (for example, is directly below) a first sentence in the document. This helps the encoder/decoder block(s) 506 understand the context across all the elements of a document, not just within a single element. Using both of these together, the encoder/decoder block(s) 506 derives a good understanding of natural language during pre-training.

In some embodiments, during pre-training, the input to the encoder/decoder block(s) 506 is a set (for example, 2) of masked sentences (sentences for which there are one or more masks), which could alternatively be partial strings or paragraphs. In some embodiments, each word is represented as a token, and some of the tokens, are masked. Each token is then converted into a word embedding (for example, 502). At the output side is the binary output for the next sentence prediction. For example, this component may output 1, for example, if masked sentence 2 followed (for example, was directly beneath) masked sentence 1. The output is word feature vectors that correspond to the outputs for the machine learning model functionality. Thus, the number of word feature vectors that are input is the same number of word feature vectors that are output.

In some embodiments, the initial embedding (for example, the input embedding 502) is constructed from three vectors: the token embeddings, the segment or context-question embeddings, and the position embeddings. In some embodiments, the following functionality occurs in the pre-training phase. The token embeddings are the pre-trained embeddings. The segment embeddings are the sentence number (that includes the input(s) 501) that is encoded into a vector (for example, first sentence, second sentence, etc. assuming a top-down and right-to-left approach). The position embeddings are vectors that represent the position of a particular word in such sentence that can be produced by positional encoder 504. When these three embeddings are added or concatenated together, an embedding vector is generated that is used as input into the encoder/decoder block(s) 506. The segment and position embeddings are used for temporal ordering since all of the vectors are fed into the encoder/decoder block(s) 506 simultaneously and language models need some sort of order preserved.

In pre-training, the output is typically a binary value C (for NSP) and various word vectors (for MLM). With training, a loss (for example, cross entropy loss) is minimized. In some embodiments, all the feature vectors are of the same size and are generated simultaneously. As such, each word vector can be passed to a fully connected layered output with the same number of neurons equal to the same number of tokens in the vocabulary.

In some embodiments, once pre-training is performed, the encoder/decoder block(s) 506 performs prompt engineering (fine-tuning or prompt-tuning) and/or zero-shot learning on a variety of QA (e.g., prompt and output) data sets by converting different QA formats into a unified sequence-to-sequence format. For example, some embodiments perform the QA task by adding a new question-answering head or encoder/decoder block, just the way a masked language model head is added (in pre-training) for performing a MLM task, except that the task is a part of prompt engineering, zero-shot learning, prompt-tuning, and/or fine-tuning. This includes the encoder/decoder block(s) 506 processing the inputs 501 (i.e., the target datasets and the prompt instructions) in order to make the predictions and confidence scores as indicated in 508. Prompt engineering, in some embodiments, is the process of crafting and optimizing text prompts for language models to achieve desired outputs. In other words, prompt engineering is the process of mapping prompts (e.g., an instruction/question) to the output (e.g., an answer) that it belongs to for training. For example, if a user asks a model to generate a poem about a person fishing on a lake, the expectation is it will generate a different poem each time. Users may then label the output or answers from best to worst. Such labels are an input to the model to make sure the model is giving a more human-like or best answers, while trying to minimize the worst answers (e.g., via reinforcement learning). In some embodiments, a "prompt" as described herein includes one or more of: a request (e.g., a question or instruction (e.g., write a summary of a poem)), one or more datasets, a command or instruction, a commans, code snippets, mathematical equations, and/or one or more examples (e.g., one-shot or two-shot examples). The "prompt instructions" as included in the inputs 501 can include any of the instructions as described herein.

The fine-tuning, prompt engineering, zero-shot learning, or runtime inputs 501 include the target dataset(s) and the prompt instructions. For example, the inputs 501 can include any portion of the inputs 204, 304, and/or 404 as illustrated in FIGS. 2, 3, and 4 respectively. As illustrated in FIG. 5, in some embodiments, these inputs 501 surpass the input embedding 502 (such that they are not numerically represented as a vector) and are directly processed by the encoder/decoder block(s) 506 in natural language form. The fine-tuning, prompt engineering, zero-shot learning, and/or runtime outputs 508 are—summary of each dataset (e.g., summary of each dataset 208 of FIG. 2), generated label(s) and description(s) (e.g., the generated label(s) and description(s) for each batch in the output 308 of FIG. 3), and the assigned label for each dataset (e.g., the assigned label for the dataset as illustrated in the output 408 of FIG. 4).

Figure 6:
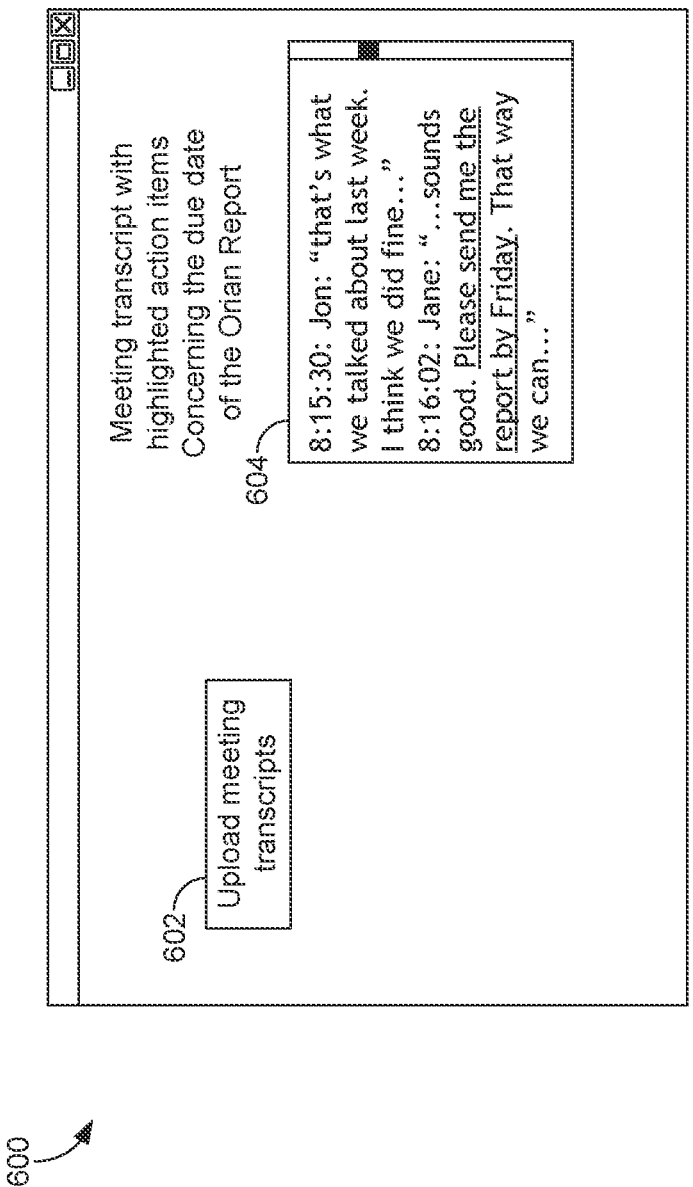
FIG. 6 is a screenshot of an example user interface, according to some embodiments.

FIG. 6 is a screenshot 600 of an example user interface, according to some embodiments. FIG. 6 represents particular application logic according to, for example, the consumer application 114 of FIG. 1. In response to receiving an indication that a user has selected the "upload meeting transcripts" button 602, particular embodiments copy various meeting transcripts corresponding to different meetings, where each meeting transcript is a particular dataset. Responsively, the components of the system 100 can perform their functionality according to the user case of action items in meetings. An "action item" as described herein may comprise a task in natural language that is requested to be completed to further a certain goal or purpose associated with a meeting. An action item in various instances may be issued via a command or other request by a person to have another person(s) (or themselves) perform some action. In an illustrative example of an action item, during a meeting regarding the development of a certain computer application, a person may say, "Bob, can you perform a round of debugging on the app today," which is an action item for Bob to perform a debugging action today in order to have the application ready for deployment.

At a first time, particular embodiments can receive a user prompt that says "summarize the action items indicated in each meeting transcript," and the dataset summarization component 102 responsively performs a natural language summary of each action item in each meeting transcript. Subsequently, particular embodiments receive another user prompt that states to "categorize all action items into a short description" and "provide a name (i.e., label) of a single word for each short description." Responsively, the dataset label and description component 105 performs its functionality. Subsequently, various embodiments receive yet another user prompt that states to "assign each meeting transcript to one or more names." Responsively, the dataset label assignment component 112 performs its functionality. Responsively, the consumer application 114 causes presentation of the window 604, the highlighted action item— "please send me the report by Friday"—as well as an indicator of the label " . . . highlighted action items concerning the due date of the Orian report."

Figure 7:
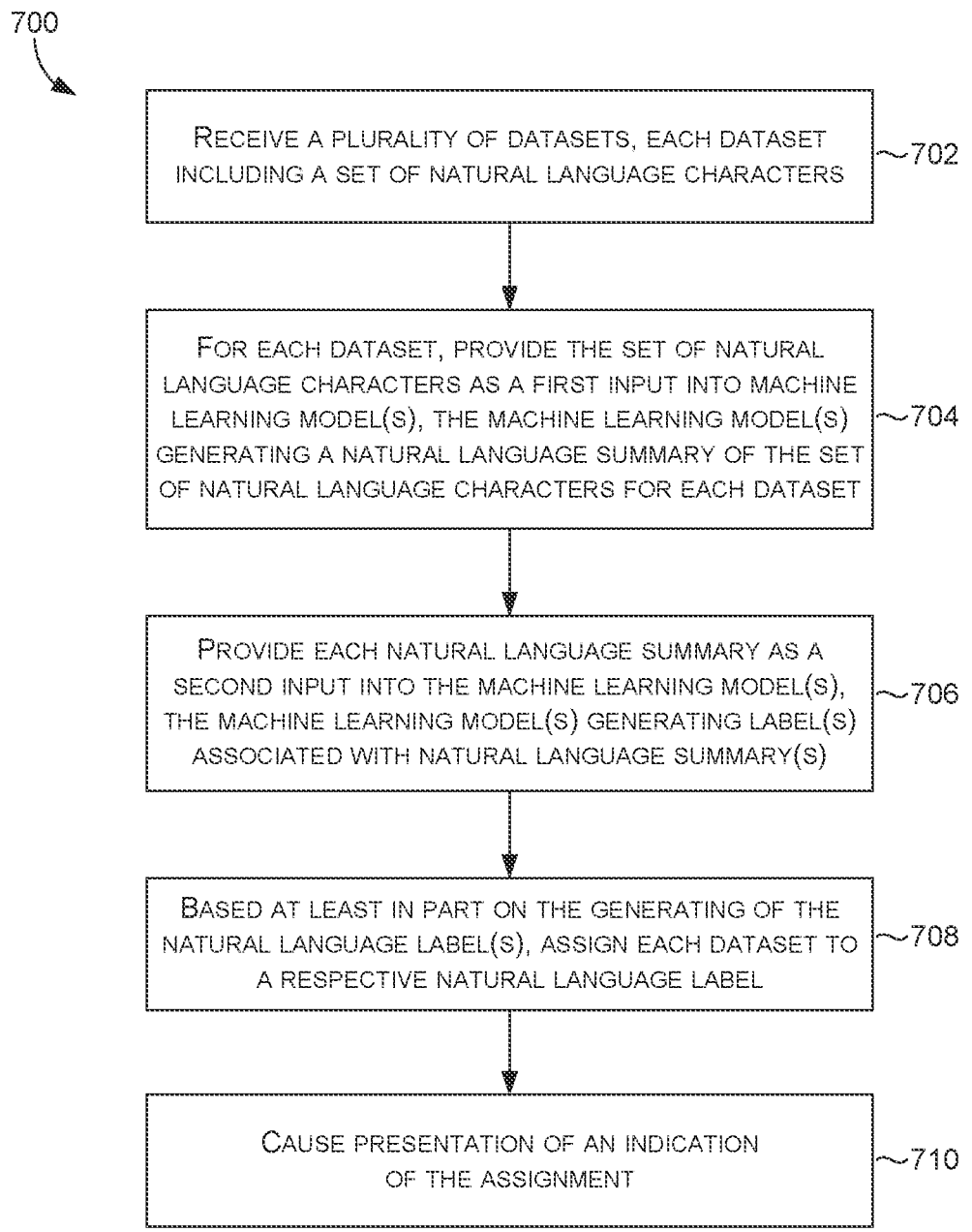
FIG. 7 is a flow diagram of an example process for assigning each dataset to a respective label, according to some embodiments.

FIG. 7 is a flow diagram of an example process 700 for assigning each dataset to a respective label, according to some embodiments. The process 700 (and/or any of the functionality described herein) may be performed by processing logic that comprises hardware (for example, circuitry, dedicated logic, programmable logic, microcode, and the like), software (for example, instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Added blocks may include blocks that embody any functionality described herein (for example, as described with respect to FIGS. 1-6). The computer-implemented method, the system (that includes at least one processor and at least one computer readable storage medium), and/or the computer readable medium as described herein may perform or be caused to perform the process 700 or any other functionality described herein.

Per block 702, particular embodiments receive a plurality of datasets, each dataset including a set of natural language characters. For example, each dataset can be defined as all chat conversations on a particular day (or time period). Per block 704, for each dataset, some embodiments provide the set of natural language characters as first input into one or more machine learning models, where the one or more machine learning models generate a natural language summary of the set of natural language characters for each dataset. For example, using the illustration above, there may be 10 messages representing all the chat conversations on a particular day (a first dataset). Such natural language summary may include a single message or sentence that summarizes the 10 messages—e.g., "the conversation on 9/7/2023 is about a report X that is due on 10/01/2023 and the people responsible for finishing the report—Jane, Jon, and Jack." Such functionality can occur for each dataset.

Per block 706, some embodiments provide each natural language summary as a second input into the one or more machine learning models, where the one or more machine learning models generate one or more labels associated with the one or more natural language summaries. For example, a language model can receive a natural language prompt from a user that states, "make topic categories for each summarized chat conversation dataset and provide a category name for such topic categories." Responsively, using the illustration above, for example, the model generates a description that may be "each of these different conversation datasets describe the report X" and "topic is report X." In some embodiments, the "input" or any other input described herein includes 1-shot or few-shot examples, which are representative or example outputs. For example, if an instruction was to "generate clusters of different sentiment," a one-shot example may include a table of datasets (different than existing datasets), where each record or row represents a cluster of a particular sentiment.

Per block 708, based at least in part on the generating of the one or more labels, some embodiments assign each dataset to a respect natural language label. For example, using the illustration above, the conversation on 9/7/2023 (a dataset) is assigned to the "report X" topic. Per block 710, some embodiments cause presentation of an indication of the assignment. For example, some embodiments cause display of one or more user interface elements, such as indicia that reads, "the conversation on 9/7/2-23 discusses report X."

Figure 8:
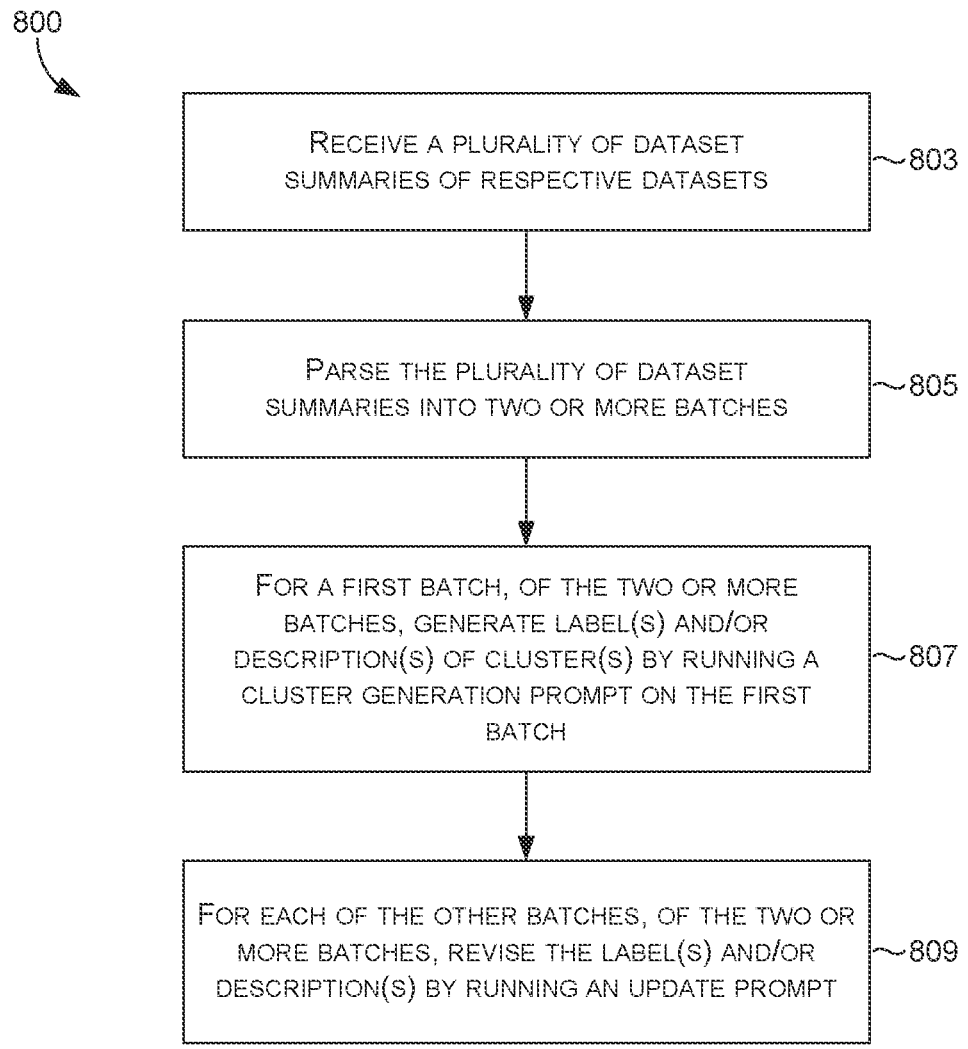
FIG. 8 is a flow diagram of an example process for generating and updating a cluster label and/or description via a generation prompt and an update prompt, according to some embodiments.

FIG. 8 is a flow diagram of an example process 800 for generating and updating a cluster label and/or description via a generation prompt and an update prompt, according to some embodiments. In some embodiments, the process 800 represents a process analogous to Stochastic Gradient Decent (SGD), as described below. Per block 803, some embodiments receive a plurality of dataset summaries of respective datasets. Per block 805, some embodiments parse the plurality of dataset summaries into two or more batches. Per block 807, for a first batch, of the two or more batches, particular embodiments generate (e.g., via a language model) one or more labels and/or one or more descriptions of one or more clusters by running a cluster generation prompt on the first batch. This represents an initialization step. Thus embodiments run cluster generation prompt on the first batch $D_0$ to derive the cluster definition (label/name plus description)=>$p_o(\theta)$. For example, the generation prompt can include natural language context or constraints (e.g., provide no more than X clusters), the use case (e.g., "group summaries in the first batch by sentiment"). In some embodiments, the functionality of block 807 is performed by the generation prompt component 106 of FIG. 1.

Per block 809, for each of the other batches, of the two or more batches (not the first batch), some embodiments revise the label and/or description by running an update prompt. In other words, analogous to Gradient Descent, for subsequent batches ($D_1, \ldots, D_M$), particular embodiments run a single update prompt on the current batch data ($D_m=\{f_i\}$) and the existing cluster definition ($P_{m-1}(\theta)$) to revise the cluster definition (name plus description) and get the update cluster definition, $P_m(\theta)$. In some embodiments, the update prompt is similar to the generation prompt but uses initial cluster names and descriptions such that the existing cluster names and/or description are updated instead of new clusters being made and/or removed. For example, more words can be added to the cluster descriptions or cluster names. In some embodiments, the functionality of block 809 is performed via the update prompt component 109 of FIG. 1.

Figure 9:
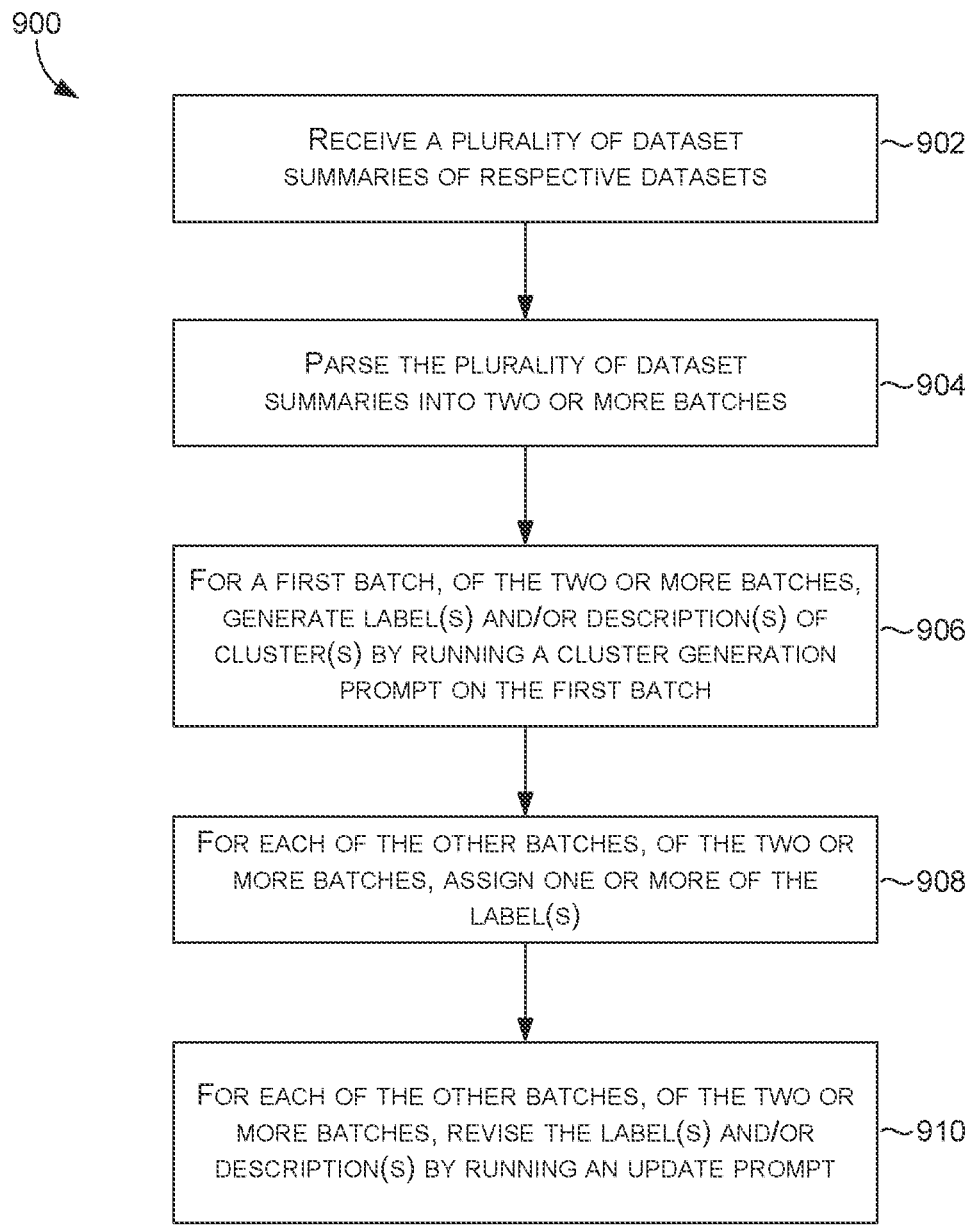
FIG. 9 is a flow diagram of an example process for generating and updating a cluster label and/or description via a generation prompt, a classification prompt, and an update prompt, according to some embodiments.

FIG. 9 is a flow diagram of an example process 900 for generating and updating a cluster label and/or description via a generation prompt, a classification prompt, and an update prompt, according to some embodiments. The process 900 is analogous to the stochastic expectation maximization (SEM) algorithm in K-means and Gaussian Mixture Models. Per block 902, some embodiments receive a plurality of dataset summaries of respective datasets. Per block 904, some embodiments parse the plurality of dataset summaries into two or more batches.

Per block 906, for a first batch, of the two or more batches, some embodiments generate one or more labels and/or a description of one or more clusters by running a cluster generation prompt on the first batch. For the initialization, particular embodiments run a cluster generation prompt on the first batch $D_o$ and get the cluster definition (name plus description)=>$P_o(\theta)$. In some embodiments, the cluster generation prompt represents the cluster generation prompt as described with respect to block 807 of FIG. 8 and/or the generation prompt component 106 of FIG. 1.

Per block 908, for each of the other batches, of the two or more batches (not the first batch), particular embodiments assign at least one label, of the one or more labels by running a classification prompt. In some embodiments, the classification prompt is processed as described with respect to the classification prompt component 108 of FIG. 1. Accordingly, for the subsequent batches ($D_1, \ldots, D_M$), there are two prompts. An "expectation" step includes running the classification prompt to assign labels on the other batches of summaries ($D_m+\{f_i\}$) based on the cluster definition from the previous initialization step to process the generation prompt ($p_{m-1}(\theta)$). In an example illustration of the classification prompt and functionality, embodiments derive the cluster label(s) and/or descriptions from the first batch. Then embodiments receive other batches of data for which embodiments assign one or more labels from one or more previous clusters on the new batches of data Per block 910, for each of the other batches, of the two or more batches (not the first batch), particular embodiments revise the one or more labels and/or one or more descriptions by running an update prompt. Accordingly, regarding a "maximization" step, particular rune a separate update prompt on both the classification results and the existing cluster definition ($P_{m-1}(\theta)$) to revise the cluster definition (name plus description) and get the update cluster definition $P_m(\theta)$. In some embodiments, the update prompt represents or includes the functionality as described with respect to block 809 of FIG. 8 and/or the update prompt component 109 of FIG. 1.

Figure 10:
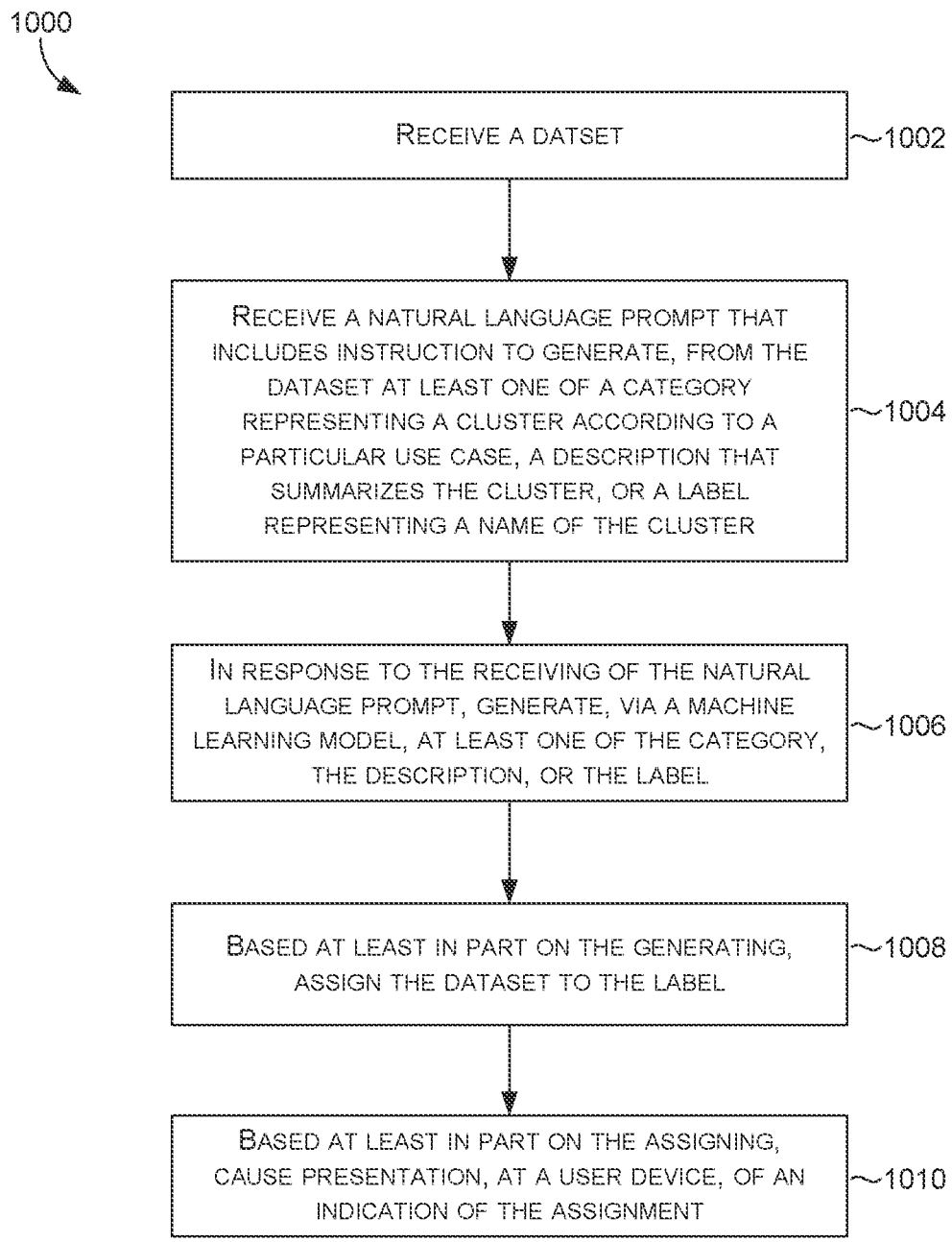
FIG. 10 is a flow diagram of an example process for assigning a dataset to a label, according to some embodiments.

FIG. 10 is a flow diagram of an example process 1000 for assigning a dataset to a label, according to some embodiments. Per block 1002, some embodiments receive a dataset. In some embodiments, a dataset is a raw dataset that has not been summarized. In some embodiments, the dataset is a larger pool of smaller datasets or a smaller set of pool of larger datasets. In some embodiments, the dataset includes several summarized and/or batched datasets. In an illustrative example, in some embodiments, the dataset represents a summary (e.g., a LLM text summary) of a larger dataset. In some embodiments, the summary is generated based at least in part on a machine learning model ingesting a zero-shot prompt that includes an instruction to summarize the dataset according to a specific use case that includes one of: sentiment, user intent, or topic of conversation. For example, referring back to FIG. 2, the zero-shot prompt can be the "summarization instruction" in the input 204 to "summarize the topic" in this dataset. In some embodiments, the dataset is batched as described, for example, with respect to FIG. 8 and FIG. 9. For example, the dataset can include a plurality of natural language summaries. Accordingly, particular embodiments parse the plurality of natural language summaries into two or more batches. In this way, different natural language summaries are grouped or chunked together (e.g., a first batch contains a first memory address and a second batch contains a second memory address).

Per block 1004, some embodiments receive a natural language prompt that includes an instruction to generate, from the dataset, at least one of: a category representing a cluster according to a particular use case, a description that summarizes the cluster, or a label representing a name (e.g., an ID or identifier) of the cluster. A natural language prompt refers to the natural language input or instruction given to the model to generate a specific response or output, which is also in natural language. For example, a prompt can be a text-based query or sentence that conveys the user's request or intent. The model then generates a response based on the information and context provided in the prompt. Prompts can be manually crafted by users or generated automatically using techniques like template-based prompts, which involve filling in predefined templates with specific information.

In some embodiments, the natural language prompt includes a zero-shot prompt (e.g., via prompt engineering) and a machine learning model is not prompt-tuned or fine-tuned and the dataset of not encoded in any numeric text embedding that relies on numeric space. Prompt-tuning involves adjusting the model itself through adjusting its weights similar to fine-tuning to improve its performance on specific tasks, while prompt engineering involves crafting input prompts to guide the model's behavior without modifying the model's architecture. Zero-shot prompting is a technique where particular embodiments use carefully crafted prompts to instruct a pre-trained language model to perform tasks or generate responses for which it has not been explicitly fine-tuned and/or prompt-tuned. This approach relies on the model's ability to generalize from its pre-training data and adapt to new tasks based on the provided prompts. Prompt engineering in the context of zero-shot prompting involves designing prompts that effectively convey the desired task or intention to the model. Various embodiments experiment with different prompt structures, keywords, and instructions to maximize the chances of the model generating the desired output for prompt engineering.

In an illustrative example of block 1004, the prompt can be "create different categories of datasets that are grouped by user intent," (indicative of an instruction to generate different clusters) "summarize each category" (indicative of a description), and/or "create a label for the categories that are no more than three words" (indicative of a label). However, various embodiments iteratively (e.g., and automatically) generate different prompts via prompt engineering to elicit the best outputs. In another illustrative example, block 1105 can included the functionality of FIG. 3.

Per block 1006, in response to the receiving of the natural language prompt, some embodiments generate, via a machine learning model (e.g., a LLM or other language model), at least one of: the category (e.g., a cluster or group), the description, and/or the label. For example, to generate a table, where each record of the table represents a cluster (e.g., based on the natural language prompt that states to create a table of clusters, where each record represents a cluster). In some embodiments, the generation of the category, the description, and/or the label at block 1006 is based on the machine learning model ingesting at least one of a generation prompt, an update prompt, and/or a classification prompt, as described, for example, in FIGS. 8 and 9. For example, for a first batch, of two or more matches, particular embodiments generate, via a generation prompt, a respective label for each cluster, of a plurality of clusters, and generate a description for each cluster. For every other batch, of the two or more batches that excludes the first batch, particular embodiments revise (via an update prompt), the respective label of a first cluster or the description of the first cluster, as described, for example, in FIG. 8.

Per block 1008, based at least in part on the generating at block 1006, some embodiments assign the dataset to the label. In some embodiments, the assigning of the dataset to the label is based on feeding the machine learning model at least on of: the dataset, a natural language summary of the dataset, a final updated label and description (e.g., as illustrated in block 809 of FIG. 8), or a label assignment instruction. Examples of this are described with respect to FIG. 4 and block 1008 can include any of the functionality as described with respect to FIG. 4.

Per block 1010, based at least in part on the assigning at block 1008, some embodiments cause presentation, at a user device, of an indication of the assignment. For example, some embodiments cause presentation of graphical elements, such as a table, that depicts a dataset and what label they belong to (e.g., showing a graphical element representing a chat conversation with the words "happy" (representing sentiment) on top of the graphical element). Subsequent to block 1010 (the processes 700, 800, 900, and/or 1100 of FIGS. 7, 8, 9, and 11 are finished), some embodiments evaluate a plurality of clusters by performing at least one of: ranking the plurality of clusters based on ingesting a model ranking prompt or determining whether the dataset or a second dataset is more similar to a reference dataset based on ingesting an instance ranking prompt, which is described in more detail blow.

Subsequent to the assigning at block 1008 and/or presentation at block 1010, some embodiments receive a particular dataset. For example, a new conversation may have been conduced between people or otherwise received. Based at least in part on the generating and the assigning (blocks 1006 and 1008), some embodiments generate a score (e.g., a confidence level interval) indicative of a prediction that at least a portion of the particular dataset belongs to the label. For example, based on prompting the model in blocks 1006 and 1008, particular embodiments automatically generate the same prompts (e.g., "summarize the sentiment in all datasets" and "assign the datasets to a particular label") for this particular dataset to obtain the prediction or score, for example, that the particular dataset likely belongs to a particular cluster and/or label of the cluster.

Figure 11:
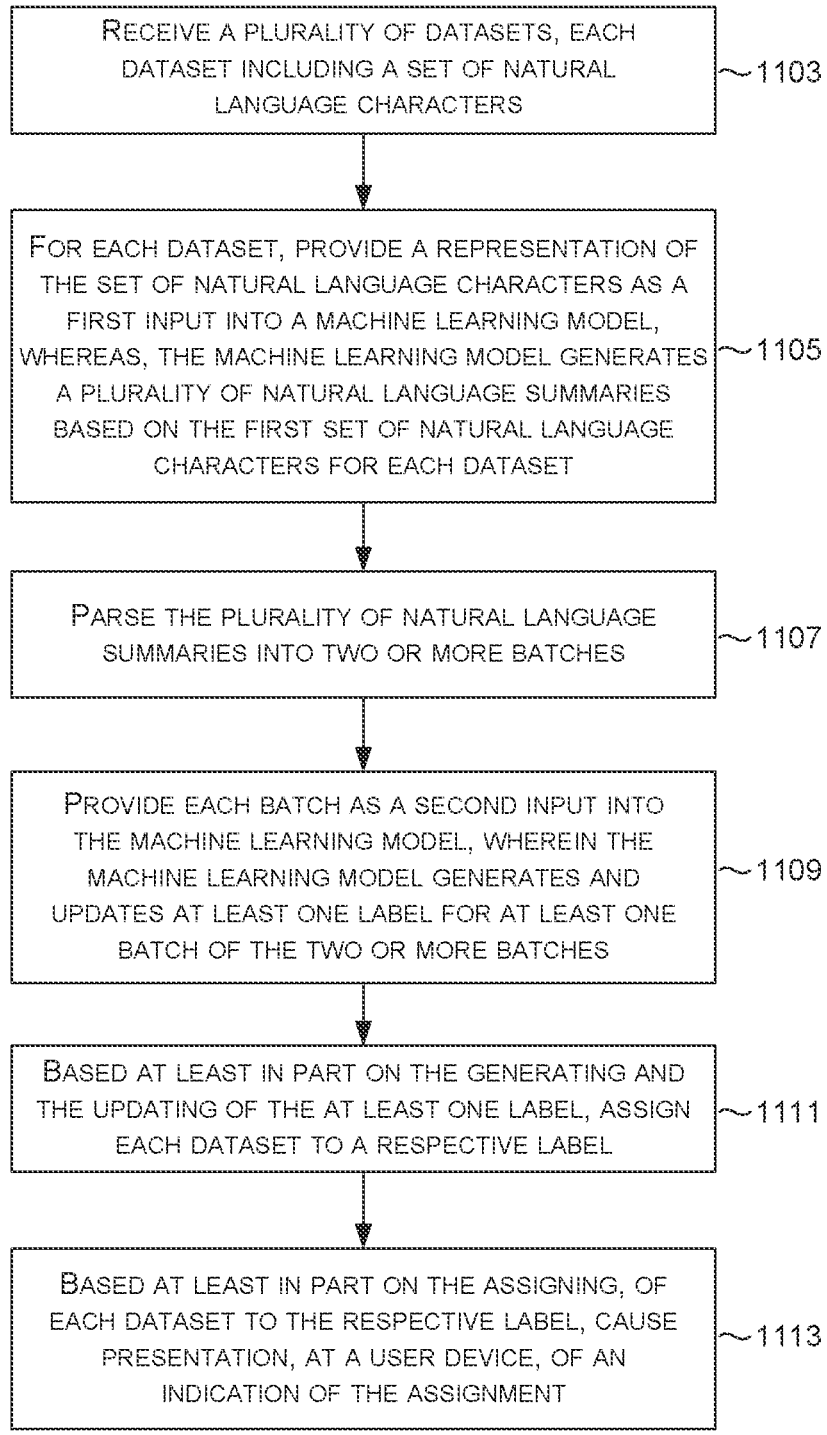
FIG. 11 is a flow diagram of an example process for assigning a dataset to a label, according to some embodiments.

FIG. 11 is a flow diagram of an example process 1100 for assigning a dataset to a label, according to some embodiments. Per block 1103, some embodiments receive a plurality of dataset, where each dataset includes a set of natural language characters. For example, particular embodiments can receive multiple documents, chat messages, transcripts, or other data objects that include natural language characters.

Per block 1105, for each dataset, some embodiments provide a representation of the set of natural language characters as a first input into a machine learning model. The machine learning model generates a plurality of natural language summaries based on the first set of natural language characters for each dataset. A "representation" of natural language characters as described herein refers to the natural language characters themselves or some other indication of the natural language characters. For example, a representation of the natural language characters can be numbers, such as a "soft prompt," which is a string of numbers used in prompt-tuning. Examples of block 1105 include FIG. 2, and can include any functionality described therein.

Per block 1107, some embodiments parse the plurality of natural language summaries into two or more batches. For example, parsing can include lexical analysis (tokenization), syntax analysis (checking for proper grammar and structure), and building a data structure (like an AST) that represents the parsed information. A "batch" can be defined by a specific data structure and/or memory address. For example, a first batch of two summaries can be included in a first data structure and a second batch of another set of summaries can be included in a second data structure. Examples of block 1107 are block 904 of FIG. 9.

Per block 1109, some embodiments provide each batch as a second input into the machine learning model, where the machine learning model generates and updates at least one label for at least one batch of the two or more batches. For example, the generation step can include block 906 of FIG. 9 and the "update" step can include the "revise" step at block 910 of FIG. 9. Based at least in part on the generating and the updating of the at least one label, some embodiments assign each dataset to a respective label, as described, for example in block 908 of FIG. 9. Per block 1113, based at least in part on the assigning of each dataset to the respective label, cause presentation, at a user device, of an indication of the assignment. For example, the user device can display a graphical element representing each dataset and each label above the graphical element representing the particular label the dataset belongs to.

Subsequent to the processes 700, 800, 900, 1000, and/or 1100 of FIGS. 7, 8, 9, 10, and 11, some embodiments perform automatic evaluations based on receiving prompts or other natural language instructions. In some embodiments, such evaluations represent an intrinsic evaluation on generated clusters. For example, some embodiments perform LLM metrics, such as LLM ranking metrics via external ground truth labels. Regarding language model ranking metrics and for language model-instructed document summaries (e.g., step 704, FIG. 2, or natural language summaries), some embodiments receive a model ranking prompt, which is a natural language prompt to a language model to rank multiple candidate clusters made on the natural language summaries based on the given batch of summaries. This can be useful for model selection. In some embodiments, such automatic evaluations represent an extrinsic evaluation (e.g., on downstream predictive tasks). For example, such extrinsic evaluation can be based on the specific use case (e.g., user intent or topic) via next query prediction.

In some embodiments, regarding raw text or datasets, some embodiments receive an instance ranking prompt. That is, given a reference document (i), particular embodiments sample two candidate datasets (j,j) where one dataset is with the same assigned cluster label ($C_j=C_i$) and another dataset is from a different cluster ($C_{j'} \neq C_i$). Particular embodiments can prompt the language model to select which candidate dataset is more similar to the reference document (i) towards the instructed use case. Particular embodiments thus run the model ranking prompt on candidate models and batched natural language summaries. Particular embodiments run the instance ranking prompt on paired datasets for each candidate model. The model ranking prompt can be run on a validation set to select the best clusters. The model ranking prompt is run for the best models selected for the instructed clustering variants on the test set.

Figure 12:
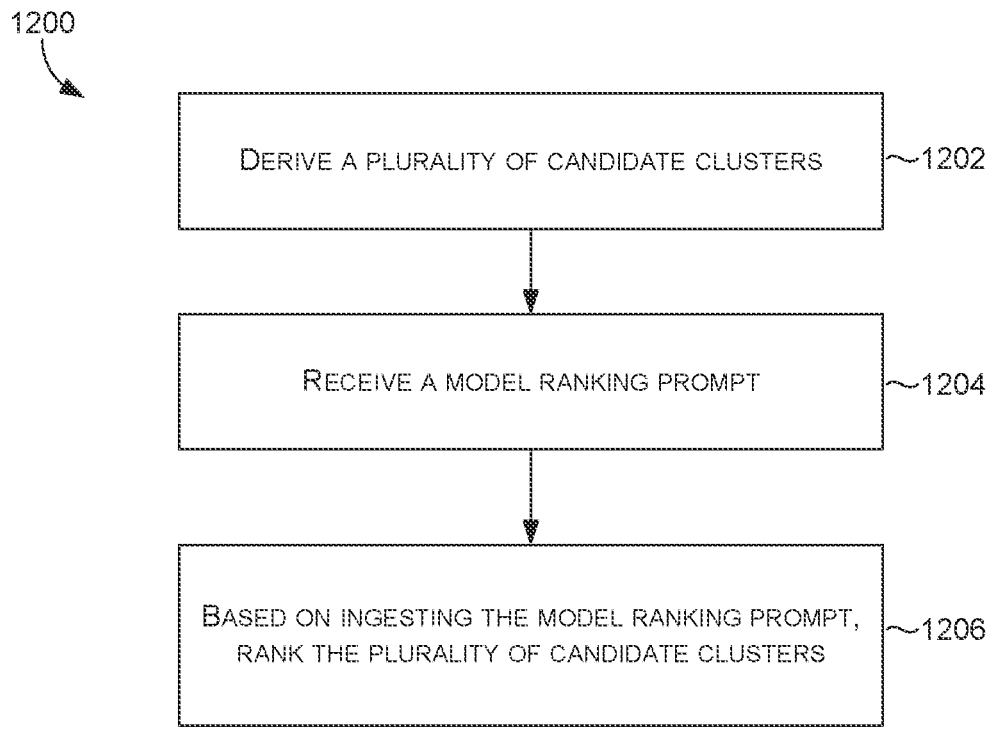
FIG. 12 is a flow diagram of an example process for evaluating cluster information based on a model ingesting a model ranking prompt, according to some embodiments.

FIG. 12 is a flow diagram of an example process 1200 for evaluating cluster information based on a model ingesting a model ranking prompt, according to some embodiments. Per block 1202, some embodiments derive (e.g., generate or receive) a plurality of candidate clusters. For example, block 1202 can include the functionality of FIG. 3, block 1006 of FIG. 10, and/or block 1109 of FIG. 11. In some embodiments, the process 1200 is performed by the cluster evaluation component 113 of FIG. 1.

Per block 1204, some embodiments receive a model ranking prompt. A model ranking prompt includes a natural language instruction to rank different candidate clusters based on the given summary(s) and/or use case indicated in the model ranking prompt. For example, the model ranking prompt can be, "evaluate and rank the provided cluster tables based on the input data for the specified use case." The criteria may include other natural language instructions, such as "your output should be in the following markdown table format: |rank| table-id| explanation|" and "|0| index of the cluster table that you think is the best|your explanation within {{explanation_length}} words||1| index of the cluster table that you think is the second best|your explanation within {{explanation_length}} words . . . " In an illustrative example, a summary of a data set may be, "this chat conversation describes John being upset with Jill for her work product." Accordingly, a first cluster may be "Jill being happy with Jack for his work ethic" and a second cluster may be "John upset with Jill" may be a second cluster.

Per block 1206, based on ingesting the model ranking prompt, some embodiments rank the plurality of clusters. For example, using the illustration above, particular embodiments rank the second cluster higher than the first cluster based on embodiments performing NLP (e.g., POS tagging, NER, etc.) on the clusters and summary to determine that the second cluster has a more semantically similar meaning to the summary than the first cluster has to the summary. In other words, the semantic meaning of the summary and respective clusters (or descriptions of the clusters) can be compared and ranked according to how semantically similar each cluster is to the respective summary or set of summaries.

Figure 13:
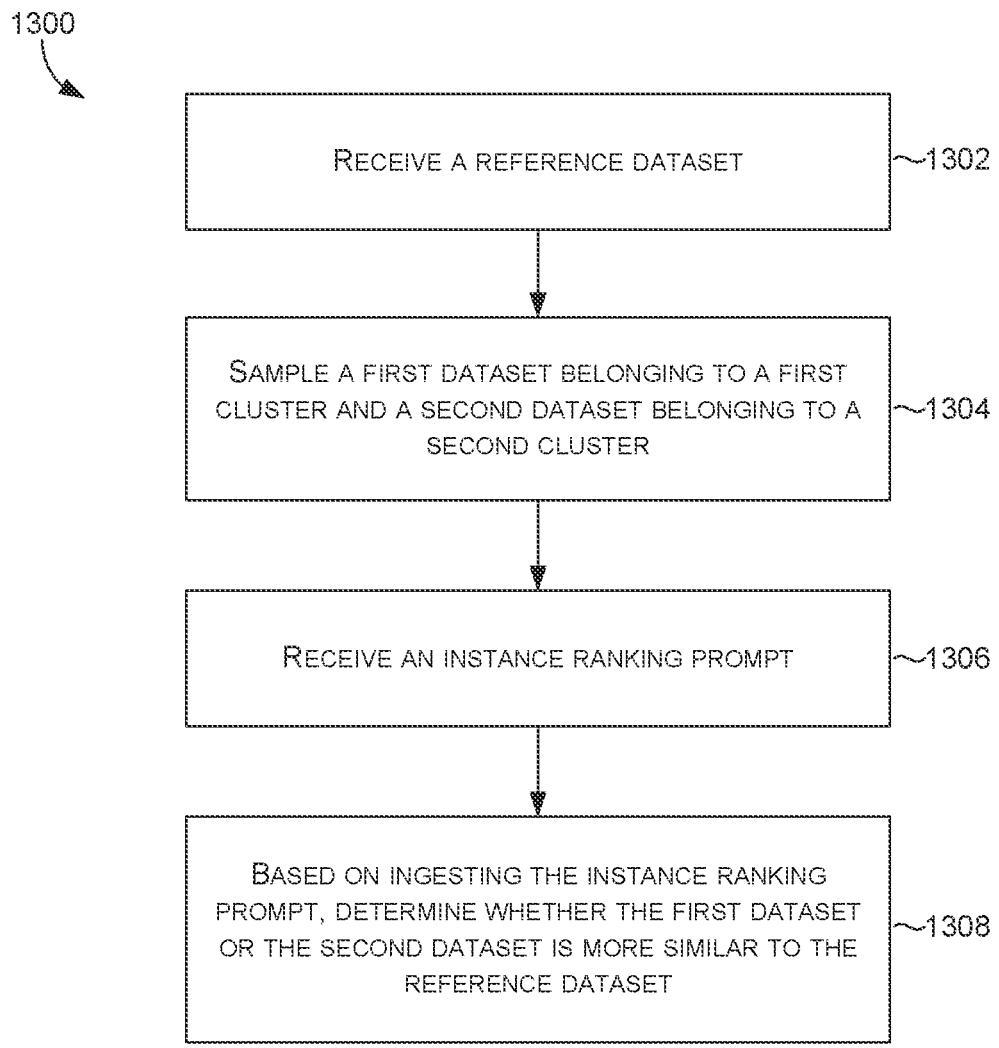
FIG. 13 is a flow diagram of an example process for evaluating cluster information by determining the similarity between datasets based on a model ingesting an instance ranking prompt, according to some embodiments.

FIG. 13 is a flow diagram of an example process 1300 for evaluating cluster information by determining the similarity between datasets based on a model ingesting an instance ranking prompt, according to some embodiments. In some embodiments, the process 1300 is performed by the cluster evaluation component 113 of FIG. 1. Per block 1302, some embodiments receive a reference dataset. A "reference" dataset is a dataset that acts as the ground truth with respect to a given use case. For example, a reference dataset may represent a particular conversation, where the topic concerns "project X" (the use case).

Per block 1304, some embodiments sample a first dataset belonging to a first cluster and a second dataset belonging to a second cluster. To sample means to select a subset or a representative sample of data points (e.g., a chat conversation message) from a larger dataset (e.g., a chat conversation thread) that has been grouped or clustered together based on some similarity or grouping criterion. In an illustrative example, sampling in block 1304 may be proceeded by a prompt in natural language to "sample a first chat conversation message belonging to a 'project X' topic and a second conversation message belonging to a 'project Y' topic," where the first chat conversation message corresponds to the first dataset and the second conversation message corresponds to the second dataset.

Per block 1306, some embodiments receive an instance ranking prompt. An instance raking prompt includes a natural language instruction to select which of the first dataset or the second dataset is more similar to the reference document based on the instructed use case. For example, using the illustration above, the instance ranking prompt can be, "select the chat conversation message that is most similar to the reference dataset—e.g., the reference dataset of "project X," as described with respect to block 1302 above.

Per block 1308, based on ingesting the instance ranking prompt, particular embodiments determine whether the first dataset or the second dataset is more similar to the reference dataset. For example, using the illustration above an example instance ranking prompt, a machine learning model or other natural language processing (NLP) functionality can perform semantic analysis, sentiment analysis, POS tagging, word matching (e.g., TF-IDF) to determine that the first chat conversation is more similar to the reference dataset is relative to the second chat conversation based on "project X" appearing more times (e.g., via TF-IDF) and the sentence being about project X, relative to the second dataset.

Below is an example illustration of various cluster IDs, cluster labels (i.e., "name"), and cluster descriptions, according to a EM-based algorithm:

|id|name|description|
  |0|Factual information seeking|User wants to learn factual information about various topics or domains, such as history, geography, science, etc.|
  |1|Skill or concept learning|User wants to learn, test, or verify concepts, skills, or knowledge in various domains or fields, such as math, programming, languages, etc.|
  |2|Text writing or editing|User wants to write, edit, or improve text for various purposes, such as writing, communication, design, etc.|
  |3|Text conversion or translation|User wants to convert or translate text from one format or language to another, such as video to text, English to Spanish, etc.|
  |4|Image generation or editing|User wants to generate, edit, or manipulate images for various purposes, such as drawing, design, entertainment, etc.|
  |5|Troubleshooting or fixing|User wants to diagnose, fix, or improve the performance or functionality of devices, software, or systems|
  |6|Fun or entertainment|User wants to have fun, play, chat, or get creative ideas with the agent|
  |7|Online shopping or booking|User wants to find, compare, or buy products, services, or activities online||8|Casual or social conversation|User wants to engage in a friendly, polite, or personal conversation with the agent without a specific task or goal|
  |9|Task completion or information provision|User wants to complete a task or provide information to the agent, such as filling a form, answering a survey, etc.|

Example Computing Architecture and Device

Figure 14:
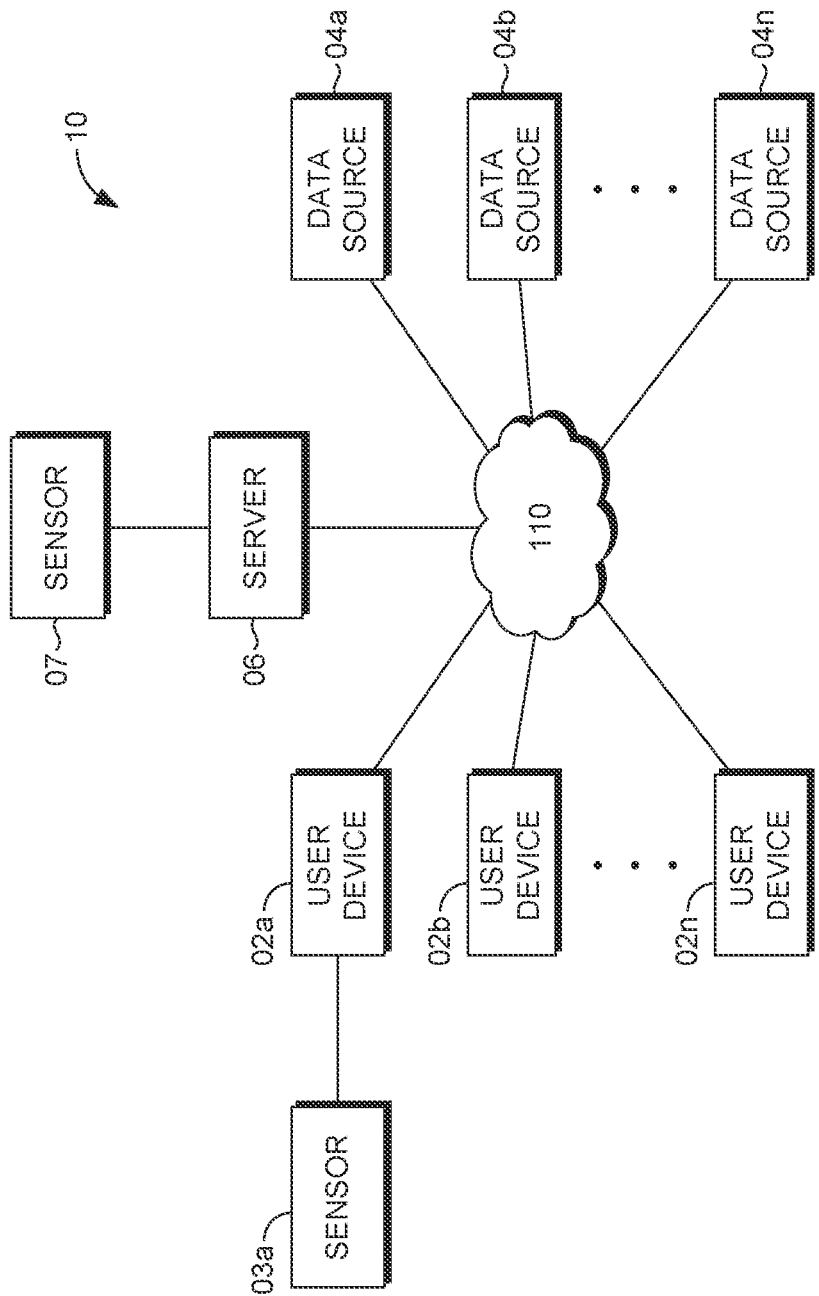
FIG. 14 is a block diagram illustrating an example operating environment suitable for implementing some embodiments of the disclosure.

Turning now to FIG. 14, a block diagram is provided showing an example operating environment 10 in which some embodiments of the present disclosure may be employed. It should be understood that this and other arrangements described herein are set forth only as examples. Other arrangements and elements (for example, machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, some functions may be carried out by a processor executing instructions stored in memory.

Among other components not shown, example operating environment 10 includes a number of user devices, such as user devices 02*a* and 02*b* through 02*n*; a number of data sources (for example, databases or other data stores, such as 105), such as data sources 04*a* and 04*b* through 04*n*; server 06; sensors 03*a* and 07; and network(s) 110. It should be understood that environment 10 shown in FIG. 14 is an example of one suitable operating environment. Each of the components shown in FIG. 14 may be implemented via any type of computing device, such as computing device 11 as described in connection to FIG. 15, for example. These components may communicate with each other via network(s) 110, which may include, without limitation, a local area network (LAN) and/or a wide area networks (WAN). In some implementations, network(s) 110 comprises the Internet and/or a cellular network, amongst any of a variety of possible public and/or private networks.

It should be understood that any number of user devices, servers, and data sources may be employed within operating environment 10 within the scope of the present disclosure. Each may comprise a single device or multiple devices cooperating in a distributed environment. For instance, server 06 may be provided via multiple devices arranged in a distributed environment that collectively provide the functionality described herein. Additionally, other components not shown may also be included within the distributed environment.

User devices 02*a* and 02*b* through 02*n* can be client devices on the client-side of operating environment 10, while server 06 can be on the server-side of operating environment 10. Server 06 can comprise server-side software designed to work in conjunction with client-side software on user devices 02*a* and 02*b* through 02*n* so as to implement any combination of the features and functionalities discussed in the present disclosure. This division of operating environment 10 is provided to illustrate one example of a suitable environment, and there is no requirement for each implementation that any combination of server 06 and user devices 02*a* and 02*b* through 02*n* remain as separate entities. In some embodiments, the one or more servers 06 represent one or more nodes in a cloud computing environment. Consistent with various embodiments, a cloud computing environment includes a network-based, distributed data processing system that provides one or more cloud computing services. Further, a cloud computing environment can include many computers, hundreds or thousands of them or more, disposed within one or more data centers and configured to share resources over the one or more network(s) 110.

In some embodiments, a user device 02*a* or server 06 alternatively or additionally comprises one or more web servers and/or application servers to facilitate delivering web or online content to browsers installed on a user device 02b. Often the content may include static content and dynamic content. When a client application, such as a web browser, requests a website or web application via a URL or search term, the browser typically contacts a web server to request static content or the basic components of a website or web application (for example, HTML pages, image files, video files, and the like). Application servers typically deliver any dynamic portions of web applications or business logic portions of web applications. Business logic can be described as functionality that manages communication between a user device and a data store (for example, a database). Such functionality can include business rules or workflows (for example, code that indicates conditional if/then statements, while statements, and the like to denote an order of processes).

User devices 02a and 02b through 02n may comprise any type of computing device capable of use by a user. For example, in one embodiment, user devices 02a through 02n may be the type of computing device described in relation to FIG. 15 herein. By way of example and not limitation, a user device may be embodied as a personal computer (PC), a laptop computer, a mobile phone or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 04a and 04b through 04n may comprise data sources and/or data systems, which are configured to make data available to any of the various constituents of operating environment 10 or system 100 described in connection to FIG. 1. Examples of data source(s) 04a through 04n may be one or more of a database, a file, data structure, corpus, or other data store. Data sources 04a and 04b through 04n may be discrete from user devices 02a and 02b through 02n and server 06 or may be incorporated and/or integrated into at least one of those components. In one embodiment, data sources 04a through 04n comprise sensors (such as sensors 03a and 07), which may be integrated into or associated with the user device(s) 02a, 02b, or 02n or server 06.

In some embodiments, operating environment 10 is utilized to implement one or more of the components of the system 100, described in FIG. 1, including components for assigning one or more datasets to one or more clusters, as described herein. Operating environment 10 also can be utilized for implementing aspects of processes 700, 800, 900 and/or any other functionality as described in connection with FIGS. 1-9.

Figure 15:
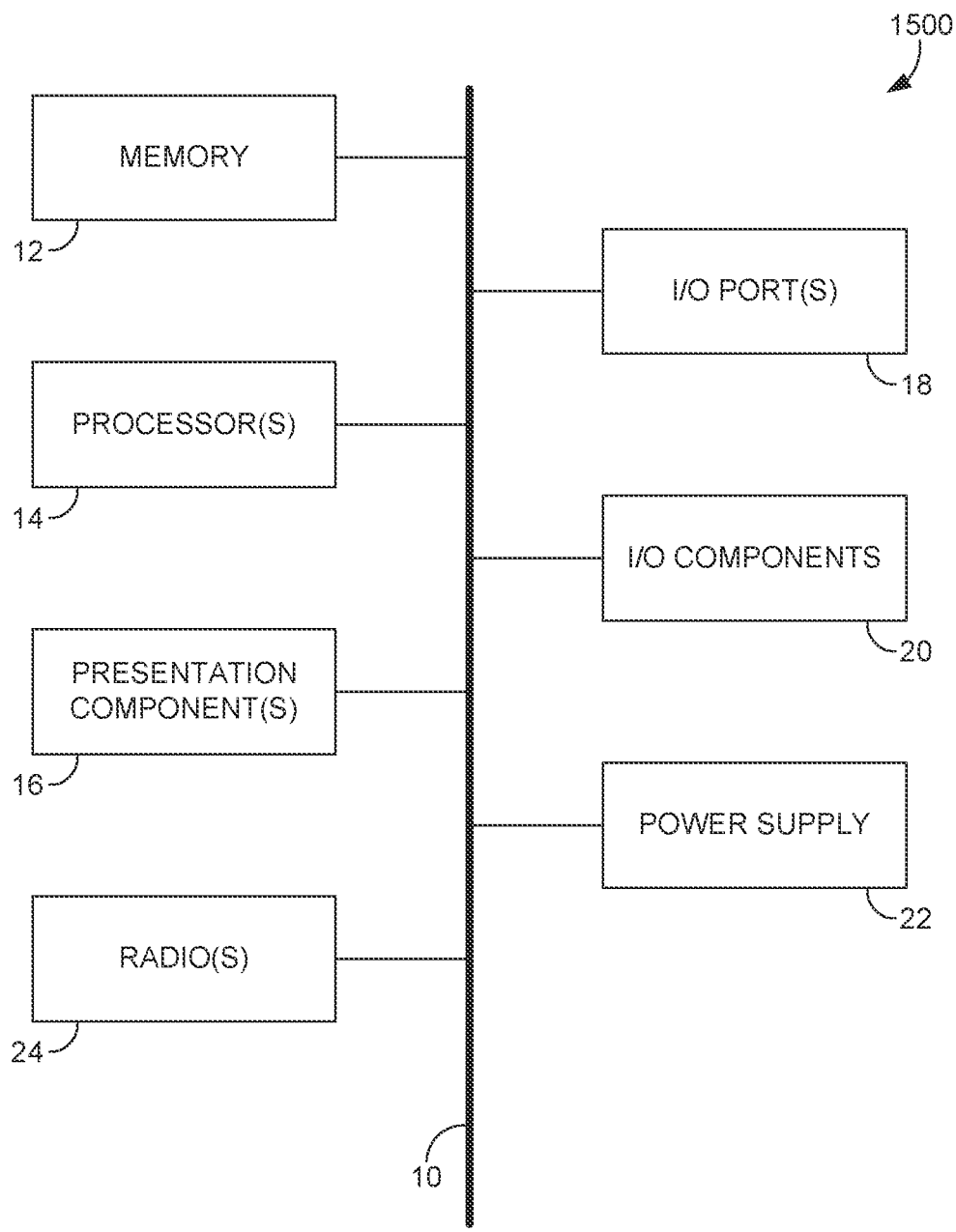
FIG. 15 is a block diagram of an example computing device suitable for use in implementing some embodiments described herein.

Having described various implementations, an exemplary computing environment suitable for implementing embodiments of the disclosure is now described. With reference to FIG. 15, an exemplary computing device is provided and referred to generally as computing device 11. The computing device 11 is but one example of a suitable computing environment and is not intended to suggest any limitation as to the scope of use or functionality of embodiments of the disclosure. Neither should the computing device 11 be interpreted as having any dependency or requirement relating to any one or combination of components illustrated.

Turning to FIG. 15, computing device 11 includes a bus 19 that directly or indirectly couples the following devices: memory 12, one or more processors 14, one or more presentation components 16, one or more input/output (I/O) ports 18, one or more I/O components 20, an illustrative power supply 22, and a hardware accelerator 26. Bus 19 represents what may be one or more busses (such as an address bus, data bus, or combination thereof). Although the various blocks of FIG. 15 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 15 is merely illustrative of an exemplary computing device that can be used in connection with one or more embodiments of the present disclosure. Distinction is not made between such categories as "workstation," "server," "laptop," "handheld device," or other computing device, as all are contemplated within the scope of FIG. 15 and with reference to "computing device."

Computing device 11 typically includes a variety of computer-readable media. Computer-readable media can be any available media that can be accessed by computing device 11 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 11. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, or other hardware. Computing device 11 includes one or more processors 14 that read data from various entities such as memory 12 or I/O components 20. Presentation component(s) 16 presents data indications to a user or other device. Exemplary presentation components include a display device, speaker, printing component, vibrating component, and the like.

The I/O ports 18 allow computing device 11 to be logically coupled to other devices, including I/O components 20, some of which may be built in. Illustrative components include a microphone, joystick, game pad, satellite dish, scanner, printer, wireless device, and the like. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 11. The computing device 11 may be equipped with depth cameras, such as stereoscopic camera systems, infrared camera systems, RGB camera systems, and combinations of these, for gesture detection and recognition. Additionally, the computing device 11 may be equipped with accelerometers or gyroscopes that enable detection of motion. The output of the accelerometers or gyroscopes may be provided to the display of the computing device 11 to render immersive augmented reality or virtual reality.

Some embodiments of computing device 11 may include one or more radio(s) 24 (or similar wireless communication components). The radio 24 transmits and receives radio or wireless communications. The computing device 11 may be a wireless terminal adapted to receive communications and media over various wireless networks. Computing device 11 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (for example, mobile hotspot) that provides access to a wireless communications network, such as a WLAN connection using the 802.11 protocol, a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Hardware accelerator 26 represents any suitable hardware component (e.g., GPU) that offloads one or more tasks (e.g., from a CPU) to accelerate or speed up the task. In some embodiments, the hardware accelerator 26 represents a Graphics Processing Unit (GPU), field programmable gate arrays (FPGA), application-specific integrated circuits (ASIC), a Tensor Processing Unit (TPU), a sound card, or any suitable hardware component.

ADDITIONAL EMBODIMENTS

Some embodiments are directed to a system comprising: at least one computer processor; and one or more computer storage media storing computer-useable instructions that, when used by the at least one computer processor, cause the at least one computer processor to perform operations comprising: receiving a plurality of datasets, each dataset including a set of natural language characters; for each dataset, providing a representation of the set of natural language characters as a first input into a machine learning model, wherein the machine learning model generates a natural language summary of the set of natural language characters for each dataset; providing a representation of each natural language summary as a second input into the machine learning model, wherein the machine learning model generates a label associated with at least a first natural language summary based at least in part on the second input, the label including fewer natural language characters than the first natural language summary; based at least in part on the generating of the label, assigning a dataset, of the plurality of datasets, to the label; and based at least in part on the assigning of the dataset to the label, causing presentation, at a user device, of an indication of the assignment of the dataset to the label.

Advantageously, these and other embodiments of the system, as described herein, have the technical effects of improved accuracy, such as clustering accuracy, relative to existing text clustering technologies. Various embodiments also have the technical effect of reduced computing resource consumption, such as reduced computer input/output (I/O), reduced processor (e.g., GPU or CPU) utilization, and reduced memory consumption, as described above in more detail.

In any combination of the above embodiments of the system, each natural language summary is included among a plurality of natural language summaries, wherein the operations further comprising: parsing the plurality of natural language summaries into two or more batches; for a first batch, of the two or more batches, generating at least one of a respective label for a set of clusters or a respective description for of the set of clusters, the respective label including the label; and for every other batch, of the two or more batches that excludes the first batch, revise at least one of: the respective label or the respective description.

In any combination of the above embodiments of the system, each natural language summary is included among a plurality of natural language summaries, wherein the operations further comprising: parsing the plurality of natural language summaries into two or more batches; for a first batch, of the two or more batches, generating one or more of the label for a first cluster or a first description for the first cluster; and for every other batch, of the two or more batches that exclude the first batch, assign the label to a second cluster in the two or more batches.

In any combination of the above embodiments of the system, the operations further comprising: for every other batch, of the two or more batches that excludes the first batch, revise at least one of: the one the label or the description.

In any combination of the above embodiments of the system, wherein the machine learning model generating the natural language summary of the set of natural language characters for each dataset is further based on the machine learning model ingesting a zero-shot prompt that includes an instruction to summarize a dataset according to a specific use case: the use case including one of: sentiment, user intent, and a topic of a conversation.

In any combination of the above embodiments of the system, wherein the machine learning model generating the label associated with at least the first natural language summary is further based on the machine learning model ingesting a prompt that includes an instruction to generate at least one of: a group or category representing a cluster, a description of the group or category, and a label of the group or category according to a specific use case, the use case including one of: sentiment, user intent, and a topic of a conversation.

In any combination of the above embodiments of the system, the assigning of the dataset to the label is based on feeding the machine learning model at least one of: each dataset, each natural language summary of each dataset, a final updated label and description, and a label assignment instruction.

In any combination of the above embodiments of the system, wherein the first input and the second input include zero-shot prompts and the machine learning model is not prompt-tuned or fine-tuned, and wherein the first input and the second input is not encoded in any numeric text embedding that relies on numeric space.

In any combination of the above embodiments of the system, the operations further comprising: subsequent to the assigning and the causing presentation, receiving a particular dataset, the particular dataset not being among the plurality of datasets; based at least in part on the providing of the set of natural language characters as the first input, the providing of each natural language summary as the second input, and the assigning of the dataset to the label, generating a score indicative of a prediction that at least a portion of the particular dataset belongs to the label; and based at least in part on the score, causing presentation, at the user device, of a second indication of the particular dataset belonging to the first label.

Some embodiments are directed to a computer-implemented method comprising: receiving a dataset; receiving a natural language prompt that includes an instruction to generate, from the dataset, at least one of: a category representing a cluster according to a particular use case, a description that summarizes the cluster of the particular use case, or a label representing a name of the cluster; in response to the receiving of the natural language prompt, generating, via a machine learning model, at least one of: the category, the description, or the label; based at least in part on the generating, assigning the dataset to the label; and based at least in part on the assigning, causing presentation, at a user device, of an indication of the assignment of the dataset to the label.

Advantageously, these and other embodiments of the computer-implemented method, as described herein, have the technical effects of improved accuracy, such as clustering accuracy, relative to existing text clustering technologies. Various embodiments also have the technical effect of reduced computing resource consumption, such as reduced computer input/output (I/O), reduced processor (e.g., GPU or CPU) utilization, and reduced memory consumption, as described above in more detail.

In any combination of the above embodiments of the computer-implemented method, the dataset includes a plurality of natural language summaries, further comprising: parsing the plurality of natural language summaries into two or more batches; for a first batch, of the two or more batches, generating a respective label for each cluster, of a plurality of clusters, and generating a description for each cluster; and for every other batch, of the two or more batches that excludes the first batch, revise at least one of: the respective label of a first cluster or the description of the first cluster.

In any combination of the above embodiments of the computer-implemented method, the at least one dataset includes a plurality of natural language summaries, further comprising: parsing the plurality of natural language summaries into two or more batches; for a first batch, of the two or more batches, generating a respective label for each cluster, of a plurality of clusters, and generating a description for each cluster; and for every other batch, of the two or more batches that exclude the first batch, assign one of the respective labels to a first cluster in the two or more batches.

In any combination of the above embodiments of the computer-implemented method, further comprising: for every other batch, of the two or more batches that excludes the first batch, revise at least one of: at least one of the respective labels of the first cluster or the description of the first cluster.

In any combination of the above embodiments of the computer-implemented method, the dataset represents a summary of a larger dataset, and wherein the summary is generated based at least in part on the machine learning model ingesting a zero-shot prompt that includes an instruction to summarize the dataset according to the specific use case: the use case including one of: sentiment, user intent, or a topic of a conversation.

In any combination of the above embodiments of the computer-implemented method, the generating is further based on the machine learning model ingesting at least one of: a generation prompt, an update prompt, and a classification prompt.

In any combination of the above embodiments of the computer-implemented method, the assigning of the dataset to the label is based on feeding the machine learning model at least one of: the dataset, a natural language summary of the dataset, a final updated label and description, and a label assignment instruction.

In any combination of the above embodiments of the computer-implemented method, the natural language prompt includes a zero-shot prompt and the machine learning model is not prompt-tuned or fine-tuned, and wherein the dataset is not encoded in any numeric text embedding that relies on numeric space.

In any combination of the above embodiments of the computer-implemented method, further comprising: subsequent to the assigning and the causing presentation, receiving a particular dataset; based at least in part on the generating and the assigning, generating a score indicative of a prediction that at least a portion of the particular dataset belongs to the label; and based at least in part on the score, causing presentation, at the user device, of a second indication of the particular dataset belonging to the label.

In any combination of the above embodiments of the computer-implemented method, further comprising evaluating a plurality of clusters by performing at least one of: ranking the plurality of clusters based on ingesting a model ranking prompt or determining whether the dataset or a second dataset is more similar to a reference dataset based on ingesting an instance ranking prompt.

Some embodiments are directed to one or more computer storage media having computer-executable instructions embodied thereon that, when executed, by one or more processors, cause the one or more processors to perform operations comprising: receiving a plurality of datasets, each dataset including a set of natural language characters; for each dataset, providing a representation of the set of natural language characters as a first input into a machine learning model, wherein the machine learning model generates a plurality of natural language summaries based on the set of natural language characters for each dataset; parsing the plurality of natural language summaries into two or more batches; providing each batch as a second input into the machine learning model, wherein the machine learning model generates and updates at least one label for at least one batch of the two or more batches; based at least in part on the generating and the updating of the at least one label, assigning each dataset to a respective label of the at least one label; and based at least in part on the assigning of each dataset to the respective label, causing presentation, at a user device, of an indication of the assignment of each dataset to the respective label.

Advantageously, these and other embodiments of the one or more computer storage media, as described herein, have the technical effects of improved accuracy, such as clustering accuracy, relative to existing text clustering technologies. Various embodiments also have the technical effect of reduced computing resource consumption, such as reduced computer input/output (I/O), reduced processor (e.g., GPU or CPU) utilization, and reduced memory consumption, as described in more detail above.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (for example, machines, interfaces, functions, orders, and groupings of functions, and the like.) can be used in addition to or instead of those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

As used herein, the term "set" may be employed to refer to an ordered (i.e., sequential) or an unordered (i.e., non-sequential) collection of objects (or elements), such as but not limited to data elements (for example, events, clusters of events, and the like). A set may include N elements, where N is any non-negative integer. That is, a set may include 1, 2, 3, . . . N objects and/or elements, where N is an positive integer with no upper bound. Therefore, as used herein, a set may include only a single element. In other embodiments, a set may include a number of elements that is significantly greater than one, two, or three elements. As used herein, the term "subset," is a set that is included in another set. A subset may be, but is not required to be, a proper or strict subset of the other set that the subset is included in. That is, if set B is a subset of set A, then in some embodiments, set B is a proper or strict subset of set A. In other embodiments, set B is a subset of set A, but not a proper or a strict subset of set A.

The invention claimed is:

1. A system comprising:
   at least one computer processor; and
   one or more computer storage media storing computer-useable instructions that, when used by the at least one computer processor, cause the at least one computer processor to perform operations comprising:
   receiving a dataset, the dataset including a set of natural language characters;
   providing, for the dataset, a representation of the set of natural language characters as a first input into a machine learning model, wherein the machine learning model generates a first output comprising a natural language summary of the set of natural language characters;
   parsing the natural language summary into two or more batches of natural language summaries, each of the two or more batches of natural language summaries comprising discrete portions of the natural language summary;
   providing a representation of each batch of the two or more batches as a second input into the machine learning model, wherein the machine learning model generates, based on the natural language summaries of the two or more batches, a label associated with at least a first natural language summary based at least in part on the second input, the label including fewer natural language characters than the first natural language summary;
   based at least in part on the generating of the label, assigning the dataset to the label; and
   based at least in part on the assigning of the dataset to the label, causing presentation, at a user device, of an indication of the assignment of the dataset to the label.

2. The system of claim 1, wherein each natural language summary is included among a plurality of natural language summaries, wherein the operations further comprise:
   for a first batch, of the two or more batches, generating at least one of a respective label for a set of clusters or a respective description for of the set of clusters, the respective label including the label; and
   for every other batch, of the two or more batches that excludes the first batch, revise at least one of: the respective label or the respective description.

3. The system of claim 1, wherein each natural language summary is included among a plurality of natural language summaries, wherein the operations further comprise:
   for a first batch, of the two or more batches, generating one or more of the label for a first cluster or a first description for the first cluster; and
   for every other batch, of the two or more batches that exclude the first batch, assign the label to a second cluster in the two or more batches.

4. The system of claim 3, wherein the operations further comprise: for every other batch, of the two or more batches that excludes the first batch, revise at least one of: the one the label or the description.

5. The system of claim 1, wherein the machine learning model generating the natural language summary of the set of natural language characters for each dataset is further based on the machine learning model ingesting a zero-shot prompt that includes an instruction to summarize a dataset according to a specific use case: the use case including one of: sentiment, user intent, and a topic of a conversation.

6. The system of claim 1, wherein the machine learning model generating the label associated with at least the first natural language summary is further based on the machine learning model ingesting a prompt that includes an instruction to generate at least one of: a group or category representing a cluster, a description of the group or category, and a label of the group or category according to a specific use case, the use case including one of: sentiment, user intent, and a topic of a conversation.

7. The system of claim 1, wherein the assigning of the dataset to the label is based on feeding the machine learning model at least one of: each dataset, each natural language summary of each dataset, a final updated label and description, and a label assignment instruction.

8. The system of claim 1, wherein the first input and the second input include zero-shot prompts and the machine learning model is not prompt-tuned or fine-tuned, and wherein the first input and the second input is not encoded in any numeric text embedding that relies on numeric space.

9. The system of claim 1, wherein parsing the natural language summary into the two or more batches comprises grouping portions of the natural language summary based on an input constraint of the machine learning model.

10. The system of claim 1, wherein parsing the natural language summary into the two or more batches comprises grouping portions of the natural language summary based on a ranges of time associated with natural language characters from the dataset.

11. A computer-implemented method comprising:
receiving a dataset;
receiving a natural language prompt that includes an instruction to generate, from the dataset, at least one of:
a category representing a cluster according to a particular use case, a description that summarizes the cluster of the particular use case, or a label representing a name of the cluster;
in response to the receiving of the natural language prompt, generating, via a machine learning model, at least one of: the category, the description, or the label, wherein the generating is further based on the machine learning model ingesting at least one of: a generation prompt, an update prompt, and a classification prompt;
based at least in part on the generating, assigning the dataset to the label; and
based at least in part on the assigning, causing presentation, at a user device, of an indication of the assignment of the dataset to the label.

12. The computer-implemented method of claim 11, wherein the dataset includes a plurality of natural language summaries, further comprising:
parsing the plurality of natural language summaries into two or more batches;
for a first batch, of the two or more batches, generating a respective label for each cluster, of a plurality of clusters, and generating a description for each cluster; and
for every other batch, of the two or more batches that excludes the first batch, revise at least one of: the respective label of a first cluster or the description of the first cluster.

13. The computer-implemented method of claim 12, wherein the at least one dataset includes a plurality of natural language summaries, further comprising:
parsing the plurality of natural language summaries into two or more batches;
for a first batch, of the two or more batches, generating a respective label for each cluster, of a plurality of clusters, and generating a description for each cluster; and
for every other batch, of the two or more batches that exclude the first batch, assign one of the respective labels to a first cluster in the two or more batches.

14. The computer-implemented method of 13, further comprising: for every other batch, of the two or more batches that excludes the first batch, revise at least one of: at least one of the respective labels of the first cluster or the description of the first cluster.

15. The computer-implemented method of claim 11, wherein the dataset represents a summary of a larger dataset, and wherein the summary is generated based at least in part on the machine learning model ingesting a zero-shot prompt that includes an instruction to summarize the dataset according to the specific use case: the use case including one of: sentiment, user intent, or a topic of a conversation.

16. The computer-implemented method of claim 11, wherein the assigning of the dataset to the label is based on feeding the machine learning model at least one of: the dataset, a natural language summary of the dataset, a final updated label and description, and a label assignment instruction.

17. The computer-implemented method of claim 11, wherein the natural language prompt includes a zero-shot prompt and the machine learning model is not prompt-tuned or fine-tuned, and wherein the dataset is not encoded in any numeric text embedding that relies on numeric space.

18. The computer-implemented method of claim 11, further comprising:
subsequent to the assigning and the causing presentation, receiving a particular dataset;
based at least in part on the generating and the assigning, generating a score indicative of a prediction that at least a portion of the particular dataset belongs to the label; and
based at least in part on the score, causing presentation, at the user device, of a second indication of the particular dataset belonging to the label.

19. The computer-implemented method of claim 11, further comprising evaluating a plurality of clusters by performing at least one of: ranking the plurality of clusters based on ingesting a model ranking prompt or determining whether the dataset or a second dataset is more similar to a reference dataset based on ingesting an instance ranking prompt.

20. One or more computer storage media having computer-executable instructions embodied thereon that, when executed, by one or more processors, cause the one or more processors to perform operations comprising:
receiving a dataset, the dataset including a set of natural language characters;
providing, for the dataset, a representation of the set of natural language characters as a first input into a machine learning model, wherein the machine learning model generates a first output comprising a natural language summary of the set of natural language characters;
parsing the natural language summary into two or more batches of natural language summaries, each of the two or more batches of natural language summaries comprising discrete portions of the natural language summary;
providing a representation of each batch of the two or more batches as a second input into the machine learning model, wherein the machine learning model generates, based on the natural language summaries of the two or more batches, a label associated with at least a first natural language summary based at least in part on the second input, the label including fewer natural language characters than the first natural language summary;

based at least in part on the generating of the label, assigning the dataset to the label; and based at least in part on the assigning the dataset to the label, causing presentation, at a user device, of an indication of the assignment of the label.

\* \* \* \* \*